(12) United States Patent
Rommer et al.

(10) Patent No.: US 9,930,579 B2
(45) Date of Patent: Mar. 27, 2018

(54) METHOD AND NODES FOR PROVIDING HANDOVER MANAGEMENT

(71) Applicant: Telefonaktiebolaget L M Ericsson (publ), Stockholm (SE)

(72) Inventors: Stefan Rommer, Västra Frölunda (SE); Qian Chen, Mölndal (SE); Daniel Nilsson, Älvängen (SE); Lars-Bertil Olsson, Angered (SE); Chunbo Wang, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 110 days.

(21) Appl. No.: 14/907,159

(22) PCT Filed: Jan. 13, 2016

(86) PCT No.: PCT/CN2016/070795
§ 371 (c)(1),
(2) Date: Jan. 22, 2016

(87) PCT Pub. No.: WO2016/115997
PCT Pub. Date: Jul. 28, 2016

(65) Prior Publication Data
US 2016/0373973 A1 Dec. 22, 2016

Related U.S. Application Data

(60) Provisional application No. 62/105,092, filed on Jan. 19, 2015.

(51) Int. Cl.
*H04W 36/00* (2009.01)
*H04W 36/14* (2009.01)
*H04W 8/04* (2009.01)

(52) U.S. Cl.
CPC ......... *H04W 36/0033* (2013.01); *H04W 8/04* (2013.01); *H04W 36/0022* (2013.01); *H04W 36/14* (2013.01)

(58) Field of Classification Search
None
See application file for complete search history.

(56) References Cited

U.S. PATENT DOCUMENTS 8,270,978 B1    9/2012  Faccin et al.
2009/0111428 A1*  4/2009  Blommaert .......... H04W 12/04
                                                      455/411

(Continued)

FOREIGN PATENT DOCUMENTS

WO   2011000448 A2   1/2011
WO   2011097820 A1   8/2011

OTHER PUBLICATIONS

International Search Report and Written Opinion dated Apr. 12, 2016 for International Application Serial No. PCT/CN2016/070795, International Filing Date: Jan. 13, 2016 consisting of 11-pages.

*Primary Examiner* — Diane Lo
(74) *Attorney, Agent, or Firm* — Christopher & Weisberg, PA

(57) ABSTRACT

The embodiments herein relate to a method in a Gn/Gp SGSN for providing handover management. The Gn/Gp SGSN provides a handover for a UE to and from a non-3GPP and 3GPP by utilizing a PDP context that was previously created for the UE during an attach procedure. The previously created PDP context is for a previously serving PGW.

13 Claims, 22 Drawing Sheets

(56) References Cited

U.S. PATENT DOCUMENTS

2009/0279515 A1\* 11/2009 Cheon ............... H04W 36/0033
370/338
2012/0170548 A1 7/2012 Rajagopalan et al.
2014/0293963 A1\* 10/2014 Xue ................... H04W 76/022
370/331

\* cited by examiner

METHOD AND NODES FOR PROVIDING HANDOVER MANAGEMENT

TECHNICAL FIELD

Embodiments herein relate generally to a Gn/Gp Serving General Packet Radio Service Support Node (SGSN), a method performed by the Gn/Gp SGSN, a Home Location Register (HLR), a method performed by the HLR, a Packet Data Network Gateway (PGW) and a method performed by the PGW. More particularly the embodiments herein relate to providing HandOver (HO) management.

BACKGROUND

In a typical cellular system, also referred to as a wireless communications network, wireless devices, also known as mobile stations and/or User Equipment (UE) units communicate via a Radio Access Network (RAN) to one or more Core Networks (CN). The wireless devices can be mobile stations or UE units such as mobile telephones also known as cellular telephones, and laptops with wireless capability, e.g. mobile termination, and thus can be, for example, portable, pocket, hand-held, computer-comprised, or car-mounted mobile devices which communicate voice and/or data with a radio access network.

The radio access network covers a geographical area which is divided into cell areas. Each cell area is served by a base station, e.g. a Radio Base Station (RBS), which in some networks is also called NodeB or B node or Evolved NodeB (eNB, eNodeB) and which in this document also is referred to as a base station. A cell is a geographical area where radio coverage is provided by the radio base station equipment at a base station site. Each cell is identified by an identity (Id, ID) within the local radio area, which is broadcast in the cell. The base stations communicate over the air interface operating on radio frequencies with the UE units within range of the base stations.

In some versions of the radio access network, several base stations are typically connected, e.g. by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks (CN).

The Universal Mobile Telecommunications System (UMTS) is a Third Generation (3G) mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using WCDMA for UE units. The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

GENERAL OVERVIEW

FIG. 1 provides a general example of a communication network 100. The communication network 100 may also be referred to as a wireless communications network. As shown in FIG. 1, a wireless device or user equipment (UE) 101 may be in communication with a RAN node 102, 103, 104 in a GSM Edge Radio Access Network (GERAN), or in a UTRAN or an Evolved UTRAN (E-UTRAN) subsystem, respectively, in order to access a Packet Data Network (PDN) 105 with services and applications of a service provide or operator, i.e. in order to access communication to an operator or application server. GERAN may also be referred to as Second Generation (2G), UTRAN may be referred to as 3G and E-UTRAN may be referred to as Fourth Generation (4G). In gaining access to the PDN 105 (e.g. Application Function (AF) or hosts), the UTRAN/E-UTRAN/GERAN subsystem RAN nodes 102-104 may be in communication with a General Packet Radio Service (GPRS) subsystem 107 or an EPC subsystem 109. The GPRS subsystem 107 may be referred to as a 3GPP subsystem. It should also be appreciated that the network may further comprise a non-3GPP subsystem (e.g. a WiFi or Wireless Local Area Network (WLAN) subsystem), although not illustrated in FIG. 1.

The UE 101 may be a device by which a subscriber may access services offered by an operator's network and services outside the operator's network to which the operator's radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The GPRS subsystem 107 may comprise a Gn/Gp SGSN 111, which may be responsible for the delivery of data packets to and from the UEs 101 within an associated geographical service area. The Gn/Gp SGSN 111 may also be responsible for packet routing, transfer, mobility management and connectivity management. The GPRS subsystem 107 may also include a Gateway GPRS Support Node (GGSN) 113, which may be responsible for the interworking between the GPRS subsystem 107 and the PDN 105. Gn is an Internet Protocol (IP) based interface between the SGSN and other SGSNs and (internal) GGSNs. Gn uses the GPRS Tunneling Protocol (GTP) Protocol. Gp is an IP based interface between internal SGSN and external GGSNs. Gp also uses the GTP Protocol.

The EPC subsystem 109 may comprise a Mobility Management Entity (MME) 115, which may be responsible for mobility management, connectivity management, idle mode UE tracking, paging procedures, attachment and activation procedures, and small data and message transfer. The term mobility management node may be used when referring to the MME 115. The EPC subsystem 109 may also comprise a Serving Gateway (SGW) 117, which may be responsible for the routing and forwarding of data packets. The EPC subsystem 109 may also include a Packet data network Gateway (PGW, PDN GW) 119, which may be responsible for providing connectivity from the UE 101 to one or more PDN(s) 105. The PGW 119 may also be referred to as a Gn PGW, a Gn-PGW or a GGSN/PGW. GGSN/PGW is a node in which the GGSN and PGW are collocated, i.e. the node has both GGSN functionality and PGW functionality. The SGW 117 may be referred to as a first gateway and the PGW 119 may be referred to as a second gateway.

Both the S4 SGSN 110 and the MME 115 may be in communication with a Home Subscriber Server (HSS) 121, which may provide UE identification information, an International Mobile Subscriber Identity (IMSI), subscription information, etc. In some embodiments, the Gn/Gp SGSN 111 communicates with the HSS 121. The HSS 121 may be referred to as a subscriber server. Another type of subscriber server is the HLR 135 which is in communication with the Gn/Gp SGSN 111. It should be appreciated that the EPC subsystem 109 may also comprise a S4 SGSN 110, thereby allowing the GERAN 102 or UTRAN 103 subsystems to be accessed when the GPRS 107 is replaced by the EPC 109. S4 is an Interface in EPC between the SGSN 110 and the SGW.

The handover procedure from non-3GPP access 123 to 3GPP access 125 is illustrated in FIG. 2a and FIG. 2b. The non-3GPP access 123 may be trusted or untrusted (trusted/untrusted), and the term non-3GPP access 123 will be used in the following when referring to any of the trusted or untrusted access. The term non-3GPP access 123 may also be referred to as non-3GPP access network, non-3GPP network, non-3GPP IP access, non-3GPP IP access network, non-3GPP IP network, non-3GPP system etc. Similarly, the term 3GPP access 125 may also be referred to as 3GPP access network, 3GPP network, 3GPP IP access, 3GPP IP access network, 3GPP IP network, 3GPP system etc. An example of a non-3GPP access 123 may be for example WiFi or WLAN. An example of a 3GPP access 125 may be for example GERAN 102, UTRAN 103 or E-UTRAN 104. So, when any of the reference numbers 102, 103 or 104 is used it is also referred to a 3GPP access 125. When the terms WiFi or WLAN is used, is also referred to a non-3GPP access 123.

The non-3GPP access 124 may be represented by for example an ePDG or a Trusted WLAN Access Network (TWAN). The ePDG is a gateway in for the EPC 109 which secures the data transmission with the UE 101 connected to the EPC over an untrusted non-3GPP access 123. For this purpose, the ePDG 123 acts as a termination node of IPsec tunnels established with the UE 101.

3GPP Technical Specification (TS) 23.402 defines the handover procedure between GERAN/UTRAN 102, 103 and WiFi access. In particular, handover from WiFi access to GERAN 102 or UTRAN 103 access connected to EPC 109 and based on S4 SGSN 110 from TS 23.402 is shown in FIG. 2a and FIG. 2b. FIG. 2a comprises steps 201-212 and FIG. 2b comprises steps 213-217. Steps 201-212 are to be performed before steps 213-217, so FIG. 2b is a continuation of FIG. 2a. The procedure in FIGS. 2a and 2b is applicable to a S4 SGSN 110 only. The AAA proxy 128 and the vPCRF 130v are involved in the procedure only in case of a roaming scenario. AAA is short for Authentication, authorization, and accounting and vPCRF is short for visited Policy and Charging Rules Function.

FIG. 2a and FIG. 2b, are message passing diagrams of a handover from 3GPP IP Access to UTRAN/GERAN 102, 103. As shown in the FIGS. 2a and 2b, at WiFi to GERAN/UTRAN 102, 103 handover, an attach procedure will be triggered first if the UE 101 is not registered in GERAN/UTRAN 102, 103 yet. The S4 SGSN 110 then performs an Update Location procedure to the HSS 121 and downloads a user subscription profile. The UE 101 further sends an Activate Packet Data Protocol (PDP) Context Request message with a Request type=Handover. The S4 SGSN 110 will then trigger a Create Session procedure with a Handover request message to the SGW 117 and the PGW 119. Upon reception of the Create Session Response message, the S4 SGSN 110 will trigger a Radio Access Bearer (RAB) establishment to complete the PDP context activation. At the successful completion of the PDP context establishment, the S4 SGSN 110 sends a Modify Bearer Request message with a Handover Request message, and the SGW 117 forwards the request to the PGW 119. The PGW 119 then switches the data path from WiFi to the GERAN/UTRAN 102, 103 interface.

PDP and PDN will now be shortly described. In LTE, bearers are the tunnels used to connect a UE 101 to PDNs 105 such as the Internet. In practice, bearers are concatenated tunnels that connect the UE 101 to the PDN 105 through the PGW 119. In UTRAN and GERAN, bearers are as PDP contexts. One PDP context connects to one PDN location by default. In other words, a PDP context is an association between a mobile host (represented by one IP address) and a PDN 105 (represented by an Access Point Name (APN)). Each PDN can be accessed via a gateway (for example a GGSN 113 or PGW 119). A PDN connection may be described as the EPC equivalent of the GPRS PDP context.

Each step in FIGS. 2a and 2b will now be described in more detail, starting with FIG. 2a.

All steps outside steps 209-211 in FIG. 2a and steps 214-215 in FIG. 2b are common for architecture variants with GTP based S5/S8 and PMIP based S5/S8. S5/S8 is the interface between the SGW 117 the PGW 119. In principle S5 and S8 is the same interface, the difference is that S8 is used when roaming between different operators while S5 is network internal. All steps 202-212 in FIG. 2a and steps 213-216 in FIG. 2b are common for architecture variants with a GTP based S2b interface and PMIP based S2b interface. S2b is an interface between the ePDG 123 and the PGW 119. S2b may be GTP based or PMIP based. The steps 207-212 in FIG. 2a and steps 213-217 in FIG. 2b shall be repeated for each PDN connection that is being transferred from non-3GPP access, and can occur in parallel for each PDN.

FIGS. 2a and 2b comprise at least some of the following steps, which steps may be performed in any suitable order than described below:

Step 201

This step is seen in FIG. 2a. The UE 101 uses a non-3GPP access 123 and is being served by PGW 119 (as Proxy Mobile Internet Protocol version 6 (PMIPv6) Local Mobility Anchor (LMA)). It is assumed that while the UE 101 is served by the non-3GPP IP access 123, a PMIPv6 tunnel is established between the non-3GPP access 123 and the PGW 119 in the EPC 109.

Step 202

This step is seen in FIG. 2a. The UE 101 discovers the 3GPP access 125 (UTRAN 103 or GERAN 102) and determines to transfer its current sessions (i.e. handover) from the currently used non-3GPP access 123 to the discovered 3GPP Access system 125.

Step 203

This step is seen in FIG. 2a. The UE 101 sends an Attach Request message to the S4 SGSN 110. The message from the UE 101 is routed by the 3GPP access 125 to the S4 SGSN 110. The S4 SGSN 110 receives the Attach Request message from the UE 101.

Step 204

This step is seen in FIG. 2a. The S4 SGSN 110 may contact the HSS 121 and authenticate the UE 101. In FIG.

2a, the HSS 121 is illustrated as HSS/AAA which involves that this node may be a HSS, an AAA or a combined HSS and AAA node.

Step 205

This step is seen in FIG. 2a. The S4 SGSN 110 may perform a location update procedure and subscriber data retrieval from the HSS 121.

Step 206

This step is seen in FIG. 2a. The S4 SGSN 110 sends the Attach Accept Request message to the UE 101 to indicate the completion of the attach procedure. The UE 101 receives the Attach Accept Request message from the S4 SGSN 110.

Step 207

This step is seen in FIG. 2a. The UE 101 initiates the establishment of the primary PDP context by sending an Activate PDP Context Request message to the S4 SGSN 110. The S4 SGSN 110 receives the Activate PDP Context Request message from the UE 101.

Step 208

This step is seen in FIG. 2a. The S4 SGSN 110 selects a SGW 117 and sends a Create Session Request message (comprising e.g. a Handover indication, and other parameters) to the selected SGW 117. The selected SGW 117 receives the Create Session Request message from the S4 SGSN 110.

Step 209

This step is seen in FIG. 2a. The SGW 117 sends a Create Session Request message to the PGW 119. The PGW 119 should not switch the tunnel from non-3GPP access 123 to 3GPP access 125 at this point. The PGW 119 receives a Create Session Request message from the SGW 117.

Step 210

This step is seen in FIG. 2a. The PGW 119 may execute a Policy and Charging Enforcement Function (PCEF) Initiated IP Connectivity Access Network (IP CAN) Session Modification Procedure with the PCRF 130 to report e.g. change in IP-CAN type.

Step 211

This step is seen in FIG. 2a. The PGW 119 responds with a Create Session Response message to the SGW 117. The Create Session Response message contains the IP address or the prefix that was assigned to the UE 101 while it was connected to the non-3GPP access 123. The SGW 117 receives the Create Session Response message from the PGW 119.

Step 212

This step is seen in FIG. 2a. The SGW 117 returns a Create Session Response message to the S4 SGSN 110. This message also includes the IP address of the UE 101. This message also serves as an indication to the S4 SGSN 110 that the S5 bearer setup and update has been successful. The S4 SGSN receives the Create Session Response message from the SGW 117.

Step 213

This step is seen in FIG. 2b. The rest of the PDP context establishment is completed in step 213.

Step 214

This step is seen in FIG. 2b. The SGW 117 sends a Modify Bearer Request message to the PGW 119 in the Visited Public Land Mobile Network (VPLMN) or the Home Public Land Mobile Network (HPLMN) including the Handover Indication flag that prompts the PGW 119 to tunnel packets from non-3GPP access 123 to 3GPP access 125 and immediately starts routing packets to the SGW 119 for the default and any dedicated EPS bearers established. In case of non-roaming or roaming with home routed traffic, this message is sent to the PGW 119 in the HPLMN. In case of local breakout traffic, the message is sent to the PGW 119 in the VPLMN. The PGW 119 receives the Modify Bearer Request message from the SGW 117.

Step 215

This step is seen in FIG. 2b. The PGW 119 acknowledges by sending a Modify Bearer Response message to the SGW 117. The SGW 117 receives the Modify Bearer Response message from the PGW 119.

Step 216

This step is seen in FIG. 2b. The UE 101 sends and receives data at this point via the 3GPP access 125.

Step 217

This step is seen in FIG. 2b. The PGW 119 shall initiate a resource allocation deactivation procedure in the non-3GPP access 123.

In the current 3GPP standard, the handover between UTRAN/GERAN 102, 103 and WiFi requires support of S4 SGSN. If Gn/Gp SGSN is used, the handover between UTRAN/GERAN and WiFi is not supported. However, most operators are keeping their Gn/Gp SGSN 111 deployments and are not upgrading their networks to support the S4-based architecture. It is therefore currently not possible for these operators to support mobility between WiFi and GERAN/UTRAN 102, 103 accesses. In addition, in case Gn/Gp SGSNs 111 are present in the network, some mobility scenarios between LTE and WiFi are not supported. For example, a scenario where the UE 101 starts in GERAN/UTRAN 102, 103 (via Gn/Gp SGSN), then moves to LTE 104 and then to WiFi is not supported using current standards. Currently, when a handover to and from WiFi and 2G/3G 102, 103 takes place, the Gn/Gp SGSN 1111 will create a new PDP context.

SUMMARY

An objective of embodiments herein is therefore to obviate at least one of the above disadvantages and to provide improved handover management.

According to a first aspect, the object is achieved by a method in a Gn/Gp SGSN for providing handover management. The Gn/Gp SGSN provides a handover for a UE to and from non-3GPP and 3GPP by utilizing a PDP context that was previously created for the UE during an attach procedure. The previously created PDP context is for a previously serving PGW.

According to a second aspect, the object is achieved by a method in a HLR for providing handover management. The HLR receives, from a Gn/Gp SGSN, an identification of a PGW at a PDN, connection establishment. The HLR stores the identification of the PGW, and sends the identification of the PGW to a HSS.

According to a third aspect, the object is achieved by a method, in a PGW for providing handover management. The PGW receives, from a Gn/Gp SGSN, a Create PDP Context Request message comprising an activated handover flag setting. The activated handover flag setting indicates a handover request for a UE. The handover is a non-3GPP to 3GPP handover.

According to a fourth aspect, the object is achieved by a Gn/Gp SGSN for providing handover management. The Gn/Gp SGSN is adapted to provide a handover for a UE to and from non-3GPP and 3GPP by utilizing a PDP context that was previously created for the UE during an attach procedure. The previously created PDP context is for a previously serving Packet data network Gateway.

According to a fifth aspect, the object is achieved by a HLR for providing handover management. The HLR is adapted to receive, from a Gn/Gp SGSN an identification of a PGW at a PDN, connection establishment. The HLR is adapted to store the identification of the PGW, and to send the identification of the PGW to a HSS.

According to a sixth aspect, the object is achieved by a PGW for providing handover management. The PGW is adapted to receive, from a Gn/Gp SGSN, a Create PDP Context Request message comprising an activated handover flag setting. The activated handover flag setting indicates a handover request for a UE. The handover is a non-3GPP to 3GPP handover.

Thanks to the PDP context that was previously created for the UE during an attach procedure, improved handover management is provided.

Embodiments herein afford many advantages, of which a non-exhaustive list of examples follows:

The embodiments herein may have the example advantage of providing support for mobility between GERAN/UTRAN and WiFi when the Gn/Gp SGSN is used. Another embodiment is that support of mobility between E-UTRAN and WiFi is enabled in case Gn/Gp SGSNs are used in the network, for example, in scenarios where the UE connects in GERAN/UTRAN over the Gn/Gp SGSN, moves to E-UTRAN and then to WiFi.

Another advantage of the embodiments herein is that when a handover to and from WiFi and 2G/3G 102, 103 takes place, the Gn/Gp SGSN 1111 does not need to create a new PDP context, i.e. a previously created PDP context is utilized instead.

The embodiments herein are not limited to the features and advantages mentioned above. A person skilled in the art will recognize additional features and advantages upon reading the following detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

In the following description, for purposes of explanation and not limitation, specific details are set forth, such as particular components, elements, techniques, etc. In order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that the term user equipment, UE and wireless device may be used interchangeably.

DETAILED DESCRIPTION

As mentioned above, currently, there are no procedures in place for a Gn/Gp SGSN 111 to provide a handover for a UE 101 to and from non-3GPP access 123 and 3GPP access 125, e.g. to and from WiFi and 2G/3G. Currently, when such a procedure takes place, the Gn/Gp SGSN 111 will create a new PDP context instead of using one that was previously created for the UE 101 during an attach procedure. A need therefore exists for a means for a Gn/Gp SGSN 111 to provide handover management for WiFi and 2G/3G in which a previously created PDP context for a previously serving PGW 119 may be utilized. The previously serving PGW 119 is a PGW which previously served the UE 101.

Thus, the example embodiments presented herein provide a means for a Gn/Gp SGSN 111 to provide handover management for WiFi and 2G/3G 102, 103 in which a previously created PDP context for a previously serving PGW 119 may be utilized. The example embodiments have the example advantage of providing support for mobility between GERAN/UTRAN 102, 103 and WiFi when the Gn/Gp SGSN 111 is used. As a side effect, also support of mobility between E-UTRAN 104 and WiFi is enabled in case Gn/Gp SGSNs 111 are used in the network, for example, in scenarios where the UE 101 connects in GERAN/UTRAN 102, 103 over the Gn/Gp SGSN 111, moves to E-UTRAN 104 and then to WiFi.

Figure 4:
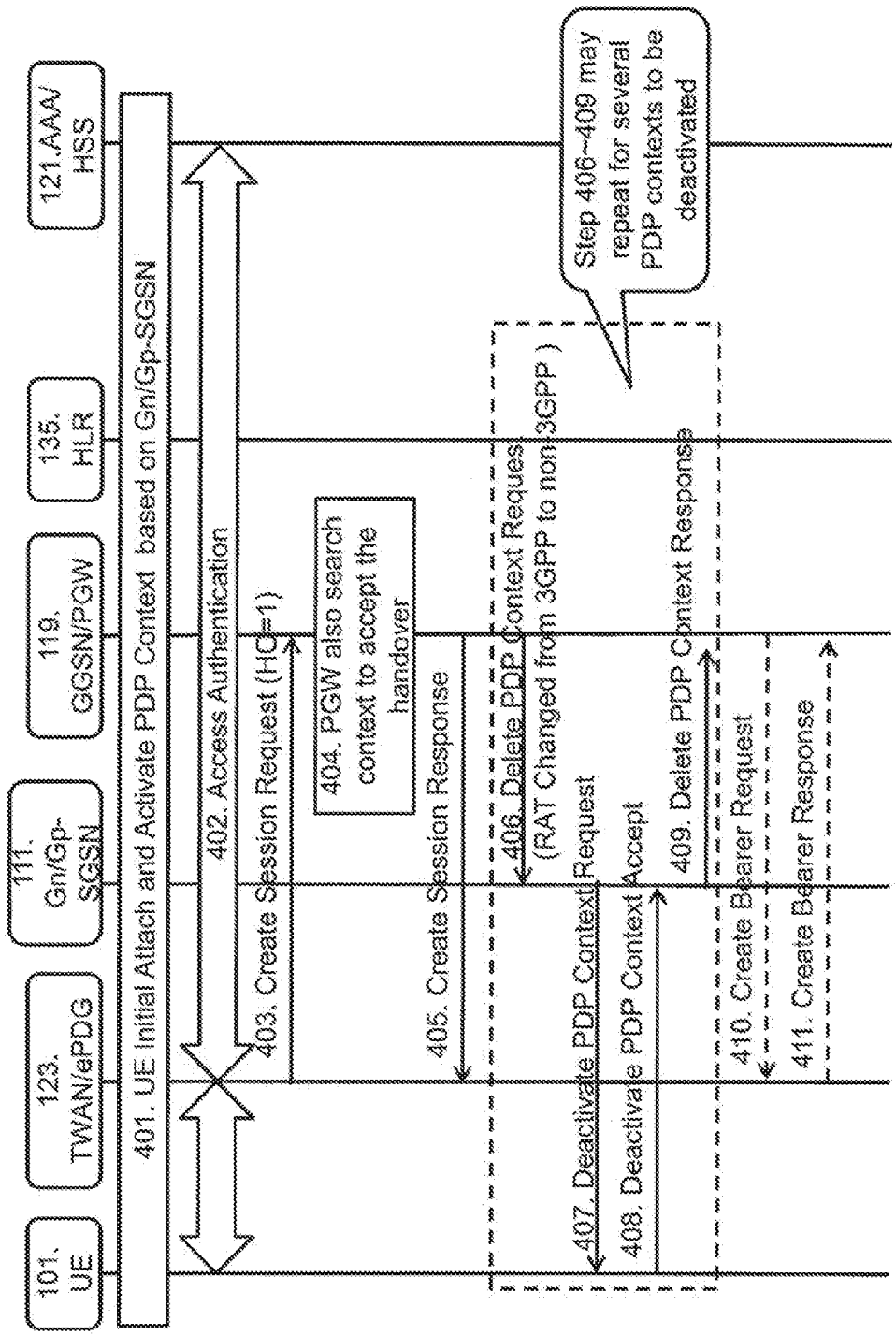
Figure 5:
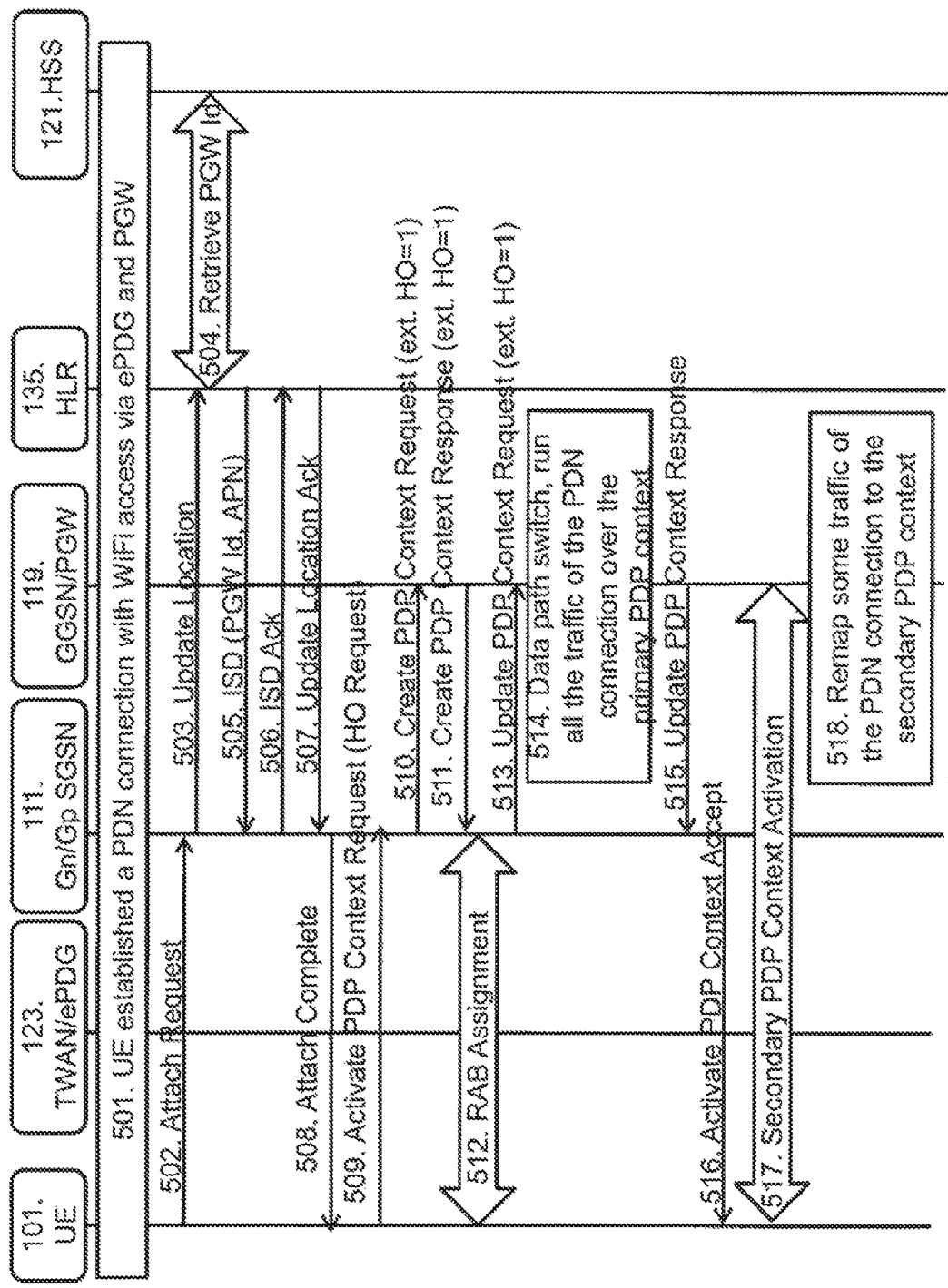

The following three scenarios will now be described with reference to FIGS. 3, 4, and 5:

1) 3GPP initial attach based on Gn/Gp SGSN (FIG. 3).
2) 3GPP to non-3GPP handover based on Gn/Gp SGSN (FIG. 4).
3) Non-3GPP to 3GPP handover based on Gn/Gp SGSN (FIG. 5).

Figure 3:
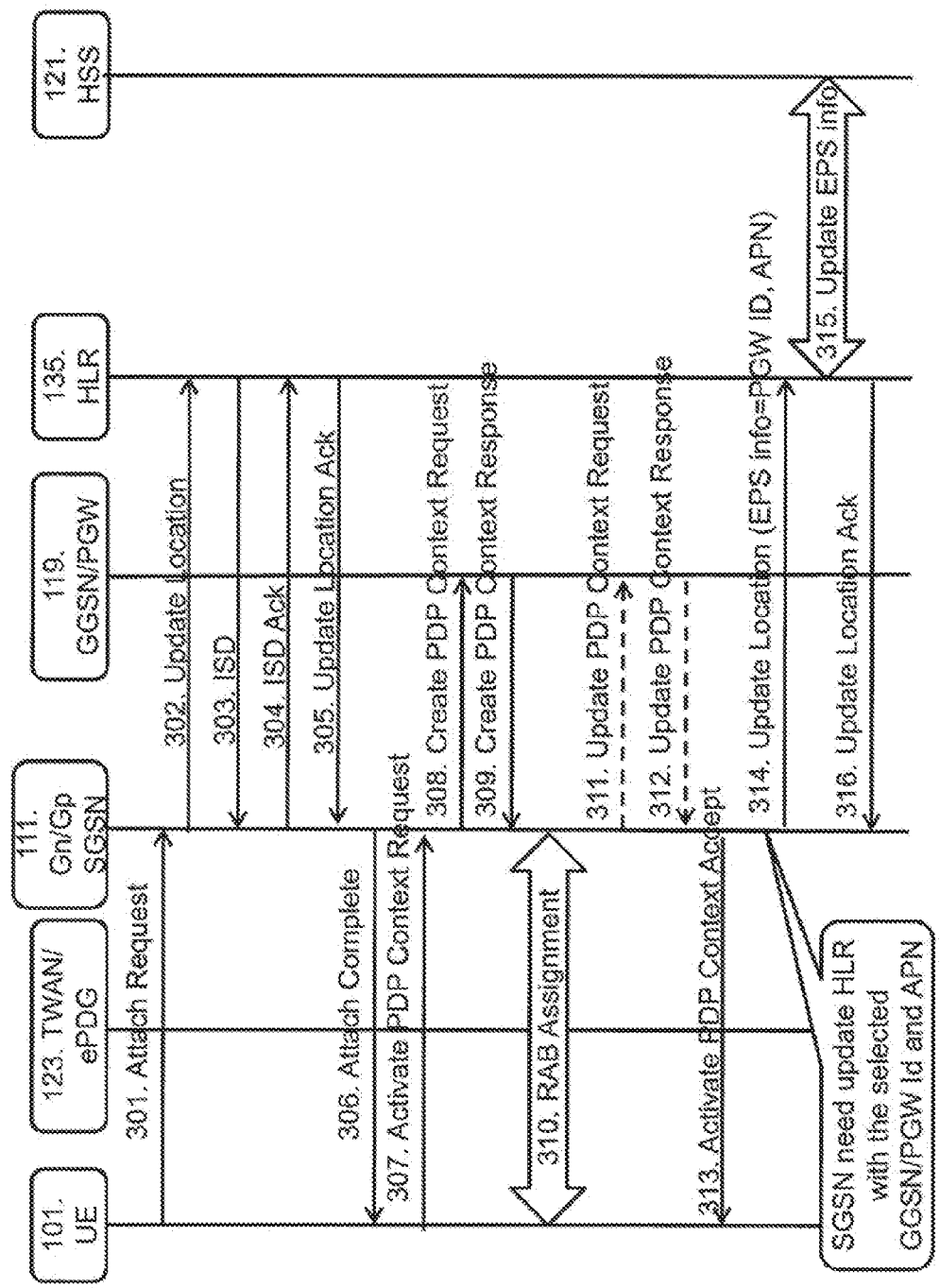
FIGS. 3-5 are message passing diagrams of a handover procedure, using a Gn/Gp SGSN, between WiFi-2G/3G, according to some of the example embodiments.

FIG. 3 illustrates scenario 1) with the 3GPP initial attach based on the Gn/Gp SGSN 111, according to some of the example embodiments. FIG. 3 uses an example where the 3GPP access 125 is represented by UTRAN/GERAN 102, 103, so FIG. 3 is an example of UTRAN/GERAN 102, 103 initial attach based on the Gn/Gp SGSN 111. However, FIG. 3 is equally applicably to any other 3GPP initial attach. In FIG. 3, the non-3GPP network 123 is represented by a TWAN or ePDG, i.e. a TWAN or an ePDG or a combined TWAN and ePDG node.

In general, steps 301-313 in FIG. 3 are the same as the normal initial attach and the PDP Activation procedure based on the Gn/Gp SGSN 111. Steps 314-315 in FIG. 3 are in order to support handover from the UTRAN/GERAN to WiFi. The Gn/Gp SGSN 111 needs to trigger the Update Location procedure over the Gr Interface as the S4 SGSN 110 to register the PGW ID and Access Point Name (APN) information on the HLR 135, and the HLR 135 needs to synchronize with the HSS 121 for the EPS information. The PGW ID and APN information may be referred to as Evolved Packet System (EPS) information. The PGW ID may also be referred to as Gn-PGW ID or PGW ID or PGW context. The APN may be a pre-existing IP address. Note that in some deployments the HLR 135 and the HSS 121 may be collocated. If the UE 101 later handovers from UTRAN/GERAN 102, 103 to WiFi, the AAA server will get the PGW ID and APN information from the HSS 121. According to the current standard of TS 23.402, if the UE 101 first registers via the Gn/Gp SGSN 111 and establishes a PDN connection under GERAN/UTRAN 102, 103, and then moves to E-UTRAN 104 (or GERAN/UTRAN 102, 103 served by the S4 SGSN 110), the PGW ID assigned to the PDN connection remains unknown to the HSS 121, and further handover from 3GPP access 125 to WiFi will not be possible. With the support of steps 314-315 in FIG. 3, such limitation can be removed because the HLR/HSS 121, 135 has been updated with the PGW ID at the PDN connection establishment via the Gn/Gp SGSN 111.

Each step seen in FIG. 3 will now be described in detail. The method in FIG. 3 comprises at least some of the following steps, which steps may be performed in any suitable order than described below:

Step 301
The UE 101 sends an Attach Request message to the Gn/Gp SGSN 111. The Gn/Gp SGSN 111 receives the Attach Request message.

Step 302
The Gn/Gp SGSN 111 sends an Update Location message to the HLR 135, and the HLR 135 receives the Update Location message from the Gn/Gp SGSN 111.

Step 303
The HLR 135 sends an Insert Subscriber Data (ISD) message to the Gn/Gp SGSN 111. The Gn/Gp SGSN 111 receives the ISD message from the HLR 135.

Step 304
The Gn/Gp SGSN 111 sends an ISD Acknowledgement (Ack) message to the HLR 135 to acknowledge the receipt of the ISD message in step 303. The HLR 135 receives the ISD Ack message from the Gn/Gp SGSN 111.

Step 305
The HLR 135 sends an Update Location Ack message to the Gn/Gp SGSN 111. The Gn/Gp SGSN 111 receives the Update Location Ack message from the HLR 135. The Update Location Ack message is a response to the Update Location message in step 302.

Step 306
The Gn/Gp SGSN 111 sends an Attach Complete message to the UE 101. The UE 101 receives the Attach Complete message from the Gn/Gp SGSN 111. The Attach Complete message indicates that the attach which was requested in step 301 has been completed.

Step 307
The UE 101 sends an Activate PDP Context Request message to the Gn/Gp SGSN 111. The Gn/Gp SGSN 111 receives the Activate PDP Context Request message from the UE 101.

Step 308
The Gn/Gp SGSN 111 sends a Create PDP Context Request message to the PGW 119. The PGW 119 receives the Create PDP Context Request message from the Gn/Gp SGSN 111.

Step 309
The PGW 119 sends a Create PDP Context Response message to the Gn/Gp SGSN 111. The Gn/Gp SGSN 111 receives the Create PDP Context Response message from the PGW 119.

Step 310
A RAB assignment is performed between the UE 101 and the Gn/Gp SGSN 111.

Step 311
The Gn/Gp SGSN 111 may send an Update PDP Context Request message to the PGW 119. This step is an optional step which is indicated with the dotted arrow in FIG. 3. The PGW 119 may receive an Update PDP Context Request message from the Gn/Gp SGSN 111.

Step 312
The PGW 119 may send an Update PDP Context Response message to the Gn/Gp SGSN 111. The Gn/Gp SGSN 111 may receive the Update PDP Context Response message from the PGW 119. The Update PDP Context Response message may be a response to the Update PDP Context Request message in step 311. This is an optional step which is indicated with the dotted arrow in FIG. 3.

Step 313
The Gn/Gp SGSN 111 sends an Activate PDP Context Accept message to the UE 101. The UE 101 receives the Activate PDP Context Accept message from the Gn/Gp SGSN 111. The Activate PDP Context Accept message may be a response to the Activate PDP Context Request message in step 307.

Step 314
The Gn/Gp SGSN 111 needs to update HLR 135 with the selected PGW ID and APN. The Gn/Gp SGSN 111 sends an Update Location message to the HLR 135. The HLR 135 receives the Update Location message from the Gn/Gp SGSN 111. The Update Location message comprises EPS information such as the PGW ID and APN.

Step 315
The HLR 135 sends the updated EPS information to the HSS 121, and the HSS 121 receives the updated EPS information. This may also be described as the HLR 135 synchronizes the updated EPS information with the HSS 121.

Step 316
The HLR 135 sends an Update Location Ack message to the Gn/Gp SGSN 111. The Gn/Gp SGSN 111 receives the Update Location Ack message from the HLR 135. The Update Location Ack message may be a response to the Update Location message in step 314 and a confirmation of that the location information has been received and successfully updated.

FIG. 4 illustrates scenario 2) with the 3GPP to non-3GPP handover of a UE 101 based on the Gn/GP SGSN 111, according to some of the example embodiments. FIG. 4 uses an example where the 3GPP access 125 is represented by UTRAN/GERAN 102, 103, so FIG. 4 is an example of UTRAN/GERAN 102, 103 to WiFi handover based on the Gn/Gp SGSN 111. However, FIG. 4 is equally applicably to any other 3GPP initial attach. In FIG. 4, the non-3GPP access 123 is represented by a TWAN or ePDG, i.e. a TWAN or an ePDG or a combined TWAN and ePDG node. The method in FIG. 4 comprises at least some of the following steps, which steps may be performed in any suitable order than described below:

Step 401

The UE 101 performs an Initial Attach and a PDP Context Activation procedure based on the Gn/Gp SGSN 101 as described in FIG. 3.

Step 402

The UE 101 decides handover to WiFi and performs a normal Internet Key Exchange version 2 (IKEv2) access authentication procedure. The AAA server will return the PGW ID to the ePDG 123. The UE 101, the ePDG 123, the AAA/HSS 121 may be involved in the access authentication procedure in step 402.

Step 403

At successful authentication, the ePDG 123 sends a Create Session Request message to the PGW 119 as the normal 3GPP to WiFi handover. The PGW 119 receives the Create Session Request message from the ePDG 123. The Create Session Request message comprises a handover flag setting which is activated, i.e. Handover Indication=1. The number 1 indicates that the handover indication is activated.

Step 404

The PGW 119 also searches the context to accept the handover. In other words, the PGW 119 needs to check both the S5/S8 PDN context and the Gn/Gp PDP context which corresponds to the PDN connection requested for handover of the UE 101 from GERAN/UTRAN 102, 103 to WiFi.

Step 405

The PGW 119 accepts the handover from GERAN/TRAN 102, 103 to WiFi by replying by sending a Create Session Response message to the ePDG 123. The ePDG 123 receives the Create Session Response message from the PGW 119. The Create Session Response message is a response to the Create Session Request message in step 403.

Step 406

The PGW 119 triggers the Gn/Gp PDP Context Deletion to the Gn/Gp SGSN 111 with the cause code "RAT Changed from 3GPP to non-3GPP" (this requires a new cause code in a GTP version 1 (GTPv1) protocol). RAT is short for Radio Access Technology. In other words, the PGW 119 sends a Delete PDP Context Request message to the Gn/Gp SGSN 111. The Delete PDP Context Request message comprises an indication of that the RAT for the UE 101 has changed from 3GPP to non-3GPP, e.g. from UTRAN/GERAN to WiFi. The Gn/Gp SGSN 111 receives the Delete PDP Context Request message from the PGW 119.

Step 407

The Gn/Gp SGSN 111 sends a Deactivate PDP Context Request message to the UE 101. The UE 102 receives the Deactivate PDP Context Request message from the Gn/Gp SGSN 111.

Step 408

The UE 101 sends a Deactivate PDP Context Response message to the Gn/Gp SGSN 111. The Gn/Gp SGSN 111 receives the Deactivate PDP Context Response message from the UE 101. The Deactivate PDP Context Response message is a response to the Deactivate PDP Context Request message in step 407 and indicates that the PDP context has been deactivated, as requested.

Step 409

The Gn/Gp SGSN 111 sends a Delete PDP Context Response message to the PGW 119. The PGW 119 receives the Delete PDP Context Response message from the Gn/Gp SGSN 111. The Delete PDP Context Response message is a response to the Delete PDP Context Request message in step 406 and indicates that the PDP context has been deleted, as requested.

Note that steps 406–409 may be repeated for several PDP contexts to be deactivated. The PDP contexts correspond to the PDN connection handed over to WiFi, as indicated with the dotted box around steps 406-409 in FIG. 4.

Step 410

The PGW 119 may trigger dedicated bearer creation if there are secondary PDP contexts to be handed over to WiFi. Thus, the PGW 119 may send a Create Bearer Request message to the ePDG 123. The ePDG 124 receives the Create Bearer Request from the PGW 119. This is an optional step which is indicated with the dotted arrow in FIG. 4.

Step 411

The ePDG 123 may create the requested bearer and may send a Create Bearer Response message to the PGW 119. The PGW 119 may receive the Create Bearer Response message from the ePDG 123. The Create Bearer Response message is a response to the Create Bearer Request message in step 410. The Create Bearer Response message may indicate that the bearer has been created, as requested.

FIG. 5 illustrates scenario 3) with the non-3GPP to 3GPP handover based on the Gn/Gp SGSN 111, according to some of the example embodiments. FIG. 5 uses an example where the 3GPP access 125 is represented by UTRAN/GERAN 102, 103 and where non-3GPP access 123 is represented by WiFi, so FIG. 5 is an example of WiFi to UTRAN/GERAN 102, 103 handover based on a Gn/Gp SGSN 111. However, FIG. 5 is equally applicably to any other non-3GPP to 3GPP handover. In FIG. 5, the non-3GPP access 123 is represented by a TWAN or ePDG, i.e. a TWAN or an ePDG or a combined TWAN and ePDG node. The method illustrated in FIG. 5 comprises at least some of the following steps, which steps may be performed in any suitable order than described below:

Step 501

The UE 101 has a PDN connection established over WiFi access via the ePDG 123 and the PGW 119.

Step 502

The UE 101 decides to handover from WiFi access to UTRAN/GERAN 102, 103 and performs a 3GPP attach procedure. The UE 101 sends an Attach Request message to the Gn/Gp SGSN 111. The Gn/Gp SGSN 111 receives the Attach Request message from the UE 101.

Step 503

The Gn/Gp SGSN 111 sends an Update Location message to the HLR 135. The HLR 135 receives the Update Location message from the Gn/Gp SGSN 111.

Step 504

The HLR 135 retrieves the PGW ID from the HSS 119.

Step 505

The HLR 135 sends an ISD message comprising the PGW ID and the APN to the Gn/Gp SGSN 111. The Gn/Gp SGSN 111 receives the ISDN message from the HLR 135. In other words, the HLR 135 provides the PGW ID and PLMN ID to the Gn/Gp SGSN 111, corresponding to an already allocated PGW(s) 119.

Step 506

The Gn/Gp SGSN 111 sends an ISD Ack to the HLR 135. The HLR 135 receives the ISD Ack from the Gn/Gp SGSN 111. The ISD Ack is an acknowledgement of the ISD message in step 505.

Step 507

The HLR 135 sends an Update Location Ack message to the Gn/Gp SGSN 111. The Gn/Gp SGSN 111 receives the Update Location Ack message from the HLR 135. The Update Location Ack message is a response to the Update Location message in step 503, acknowledges that the Update Location message in step 503 has been received.

Step 508

The Gn/Gp SGSN 111 sends an Attach Complete message to the UE 101. The UE 101 receives the Attach Complete message from the Gn/Gp SGSN 111. The Attach Complete message is a response to the Attach Request message in step 502, and indicates that the requested attach is complete.

Step 509

The UE 101 sends an Activate PDP Context Request message with a Handover Request as the normal WiFi to UTRAN/GERAN 102, 103 handover. Note that the UE 101 is not aware whether it is a S4 SGSN 110 or a Gn/Gp SGSN 111 it is sending the message to. The Gn/Gp SGSN 111 needs to be able to process such Handover Request (not supported by Gn/Gp SGSN today). The Gn/Gp SGSN 111 receives the Activate PDP Context Request message from the UE 101.

Step 510

The Gn/Gp SGSN 111 needs to add a new extension to indicate a Handover Request in the Create PDP Context Request message. Thus, the Gn/Gp SGSN 11 sends the Create PDP Context Request message to the PGW 119. The Create PDP Context Request message comprises an activated handover flag setting, e.g. HO=1.

Step 511

The PGW 119 learns the non-3GPP to 3GPP handover request, and finds the PDN context on the WiFi access to be handed over. The PGW 119 replies to the Gn/Gp SGSN 111 with a Create PDP Context Response message including the new extension to indicate to the Gn/Gp SGSN 111 that the PGW 119 can support the non-3GPP to 3GPP handover. The extension may be an activated handover flag setting, e.g. HO=1. The Create PDP Context Response message comprises at least part of the context for the Gn/Gp SGSN 111 which has been identified by the PGW 119. The Gn/Gp SGSN 111 receives the Create PDP Context Response message from the PGW 119. The Create PDP Context Response message is a response to the Create PDP Context Request message in step 510.

Step 512

The Gn/Gp SGSN 111 triggers a RAB Assignment procedure towards the RAN, e.g. the Gn/Gp SGSN 111.

Step 513

At the successful RAB Assignment procedure, the Gn/Gp SGSN 111 needs to send an Update PDP Context Request message with the new Handover extension to the PGW 119 even if there is no Quality of Service (QoS) update if the Gn/Gp SGSN 111 learns that the PGW 119 can support the non-3GPP to 3GPP handover at step 511. The handover extension may be the activated handover flag setting, e.g. HO=1. Otherwise, the Gn/Gp SGSN 111 can follow the legacy behavior of the PDP Activation. The PGW 119 receives the Update PDP Context Request message from the Gn/Gp SGSN 111.

Step 514

The PGW 119 switches data path to UTRAN/GERAN access upon reception of the Update PDP Context Request message with the Handover extension in step 513. At this step, in order to reduce packet drop rates, the PGW 119 shall run all the user traffic of the handed over PDN connection over the primary PDP context considering that the WLAN radio may have degraded already.

Step 515

The PGW 119 replies with an Update PDP Context Response message to the Gn/Gp SGSN 111. The Gn/Gp SGSN 111 receives the Update PDP Context Response message from the PGW 119. The Update PDP Context Response message is a response to the Update PDP Context Request message in step 513.

Step 516

The Gn/Gp SGSN 111 sends an Activate PDP Context Accept message to the UE 101. The UE 101 receives the Activate PDP Context Accept message from the Gn/Gp SGSN 111. The Activate PDP Context Accept message is a response to the Activate PDP Context Request message in step 509.

Step 517

The PGW 119 shall trigger the Secondary PDP Context Activation procedure if there are the dedicated bearers established for WiFi access before handover or depending on the active Policy and Charging Control (PCC) rules.

Step 518

After the successful Secondary PDP Context Activation, the PGW 119 shall remap the user traffics (which run on the dedicated bears over WiFi access) onto the newly established Secondary PDP contexts, i.e. remap some traffic of the PDN connection to the secondary PDP context.

If the UE 101 has established a voice or video call at WiFi access before the handover, the UTRAN/GERAN 102, 103 needs to have a policy for how to support the voice or video call continuity after handover. The UTRAN/GERAN RAN may not support voice or a video radio bearer (Conversational QoS class). In that scenario, when triggering the Secondary PDP Context Activation procedure, the PGW 119 can decide to reduce the QoS level of the voice or video bearers based on the operator policy, or even drop the video traffic completely and only keep the voice traffic. The PGW 119 may also install all the traffic on the default bearer (primary PDP context) without triggering the Secondary PDP Context Activation. That is the deviation compared with WiFi to LTE handover.

Example Node Configurations

Figure 6:
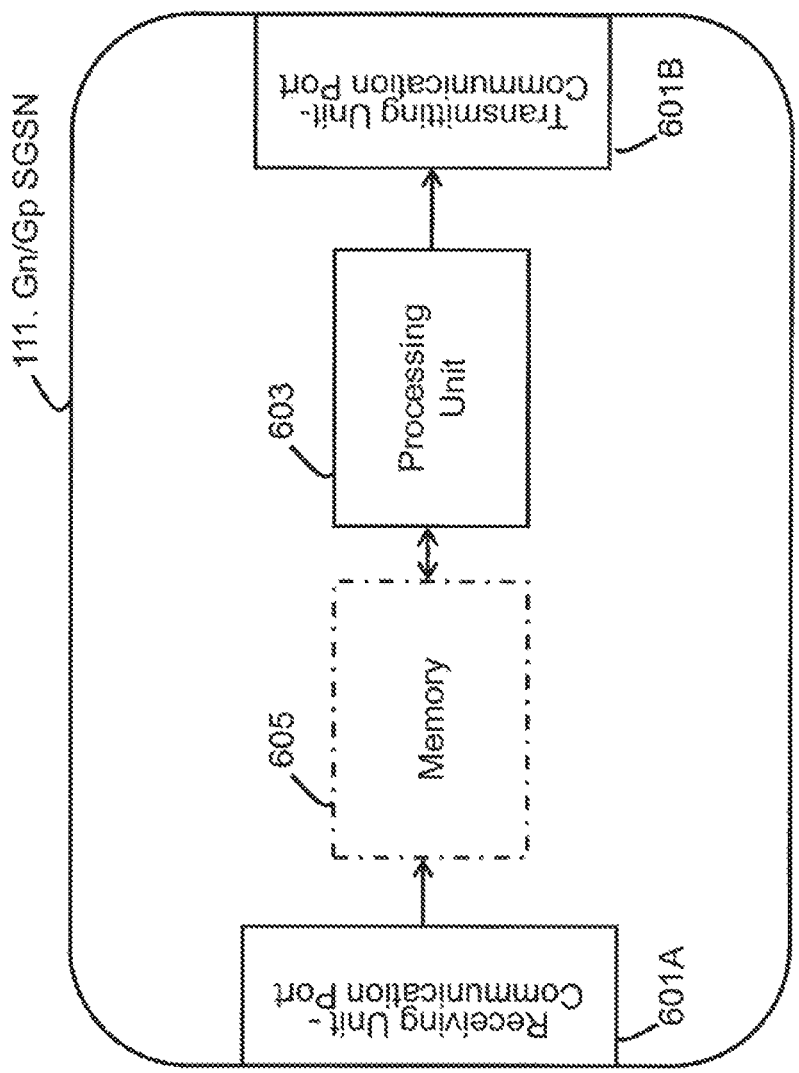
FIG. 6 is an example node configuration of a Gn/Gp SGSN, according to some of the example embodiments.

FIG. 6 illustrates an example node configuration of the Gn/Gp SGSN 111. The Gn/Gp SGSN 111 may perform some of the example embodiments described herein. The Gn/Gp SGSN 111 may comprise radio circuitry, a communication port or a receiving unit 601A and transmitting unit 601B that may be configured to receive and/or transmit communication data, instructions, messages and/or any information related to handover management. It should be appreciated that the radio circuitry, a communication port or a receiving 601A and transmitting 601B units may be comprised as any number of transceiving, receiving, and/or transmitting units, modules or circuitry.

The Gn/Gp SGSN 111 may also comprise a processing unit 603, processing module or processing circuitry which may be configured to provide and retrieve handover related information as described herein. The processing unit 603 may be any suitable type of computation unit, for example, a microprocessor, digital signal processor (DSP), field programmable gate array (FPGA), or application specific integrated circuit (ASIC), or any other form of circuitry. The Gn/Gp SGSN 111 may further comprise a memory 605, memory unit or memory circuitry which may be any suitable type of computer readable memory and may be of volatile and/or non-volatile type. The memory 605 may be configured to store received, transmitted, and/or measured data, device parameters, communication priorities, any form of handover related information and/or executable program instructions.

Figure 7:
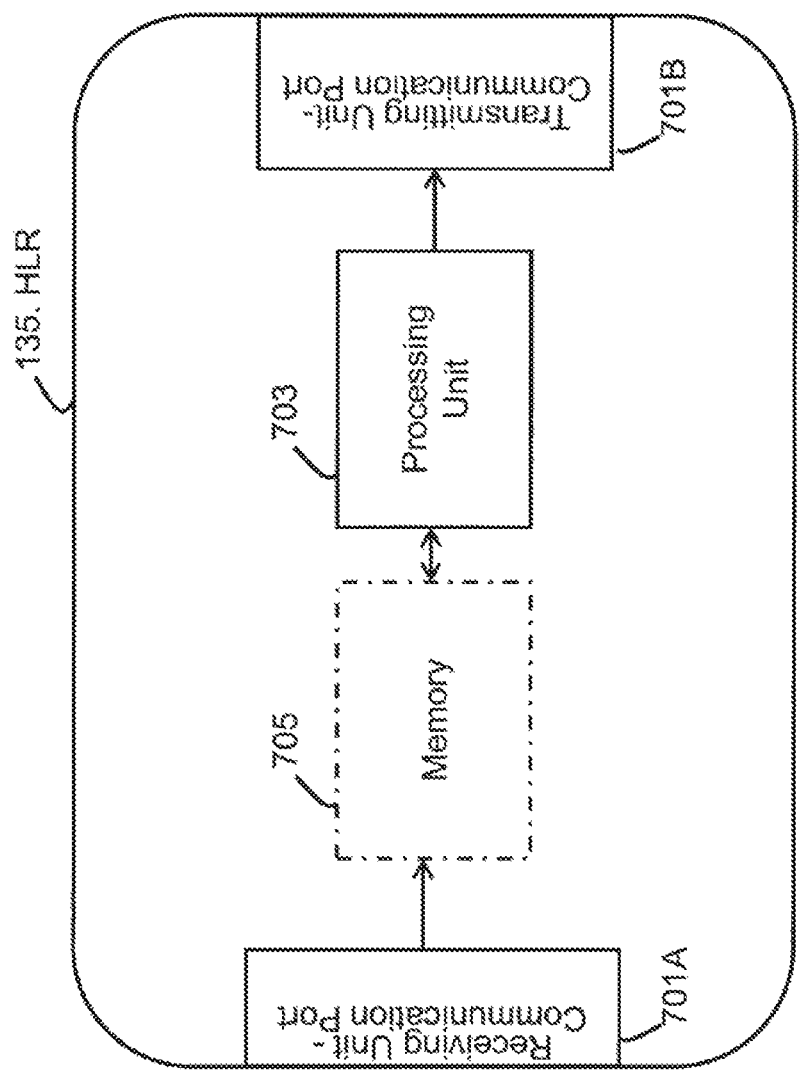
FIG. 7 is an example node configuration of a HLR, according to some of the example embodiments.

FIG. 7 illustrates an example node configuration of the HLR 135. The HLR 135 may perform some of the example embodiments described herein. The HLR 135 may comprise radio circuitry, a communication port or a receiving unit 701A and transmitting unit 701B that may be configured to receive and/or transmit communication data, instructions, messages and/or any information related to handover management. It should be appreciated that the radio circuitry, a communication port or a receiving 701A and transmitting 701B units may be comprised as any number of transceiving, receiving, and/or transmitting units, modules or circuitry.

According to some of the example embodiments, the transmitting may be performed with the use of an update location request message. It should also be appreciated that the HLR may alternatively receive the identification of the PGW 119 from the HSS 121. It should be appreciated that, according to some of the example embodiments, the HLR 135 need not store the identification of the PGW 119 but merely receive and then send the identification to the HSS 121.

The HLR 135 may also comprise a processing unit 703, processing module or processing circuitry which may be configured to provide and retrieve HO related information as described herein. The processing unit 703 may be any suitable type of computation unit, for example, a microprocessor, DSP, FPGA, or ASIC or any other form of circuitry. The HLR 135 may further comprise a memory 705, memory unit or memory circuitry which may be any suitable type of computer readable memory and may be of volatile and/or non-volatile type. The memory 705 may be configured to store received, transmitted, and/or measured data, device parameters, communication priorities, any form of handover related information and/or executable program instructions.

Figure 8:
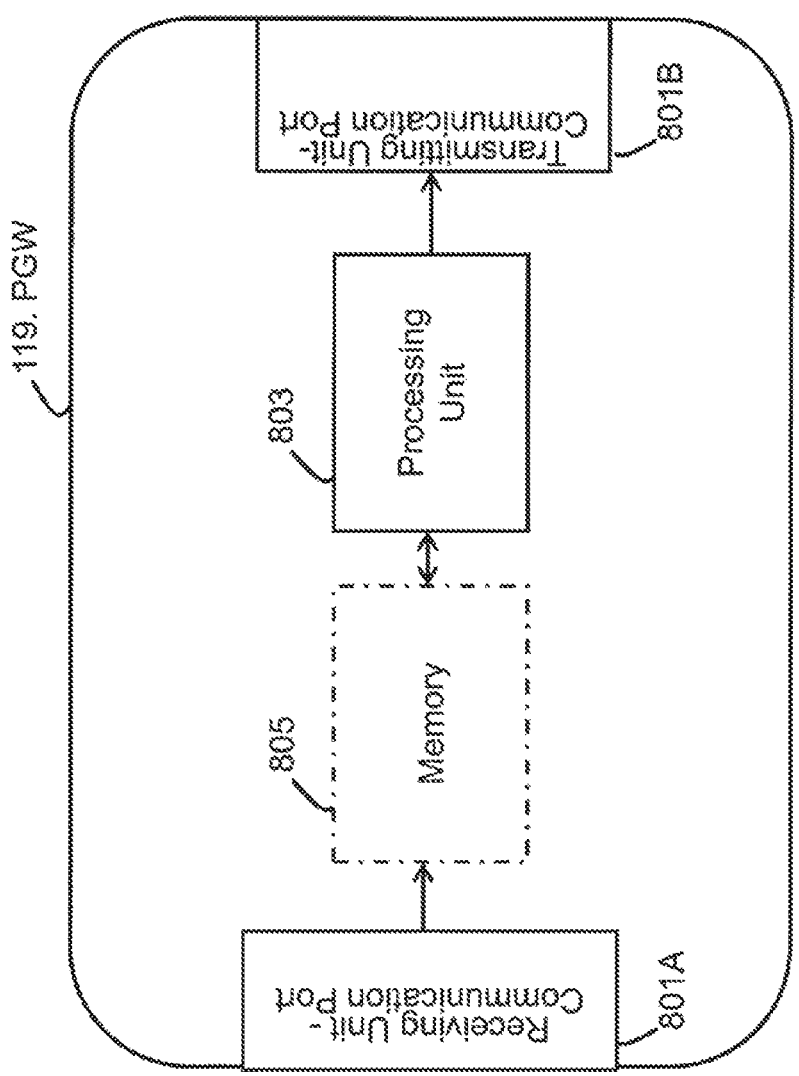
FIG. 8 is an example node configuration of a PGW, according to some of the example embodiments.

FIG. 8 illustrates an example node configuration of the PGW 119. The PGW 119 may be a Gn-PGW 119, a GGSN or a combined GGSN and PGW node (GGSN/PGW). The PGW 119 may perform some of the example embodiments described herein. The PGW 119 may comprise radio circuitry, a communication port or a receiving unit 801A and transmitting unit 801B that may be configured to receive and/or transmit communication data, instructions, messages and/or any information related to handover management. It should be appreciated that the radio circuitry, a communication port or a receiving 801A and transmitting 801B units may be comprised as any number of transceiving, receiving, and/or transmitting units, modules or circuitry.

The PGW 119 may also comprise a processing unit 803, processing module or processing circuitry which may be configured to provide and retrieve handover related information as described herein. The processing unit 803 may be any suitable type of computation unit, for example, a microprocessor, DSP, FPGA, or ASIC or any other form of circuitry. The PGW may further comprise a memory 805, memory unit or memory circuitry which may be any suitable type of computer readable memory and may be of volatile and/or non-volatile type. The memory 805 may be configured to store received, transmitted, and/or measured data, device parameters, communication priorities, any form of handover related information and/or executable program instructions.

Example Node Operations

Figure 9:
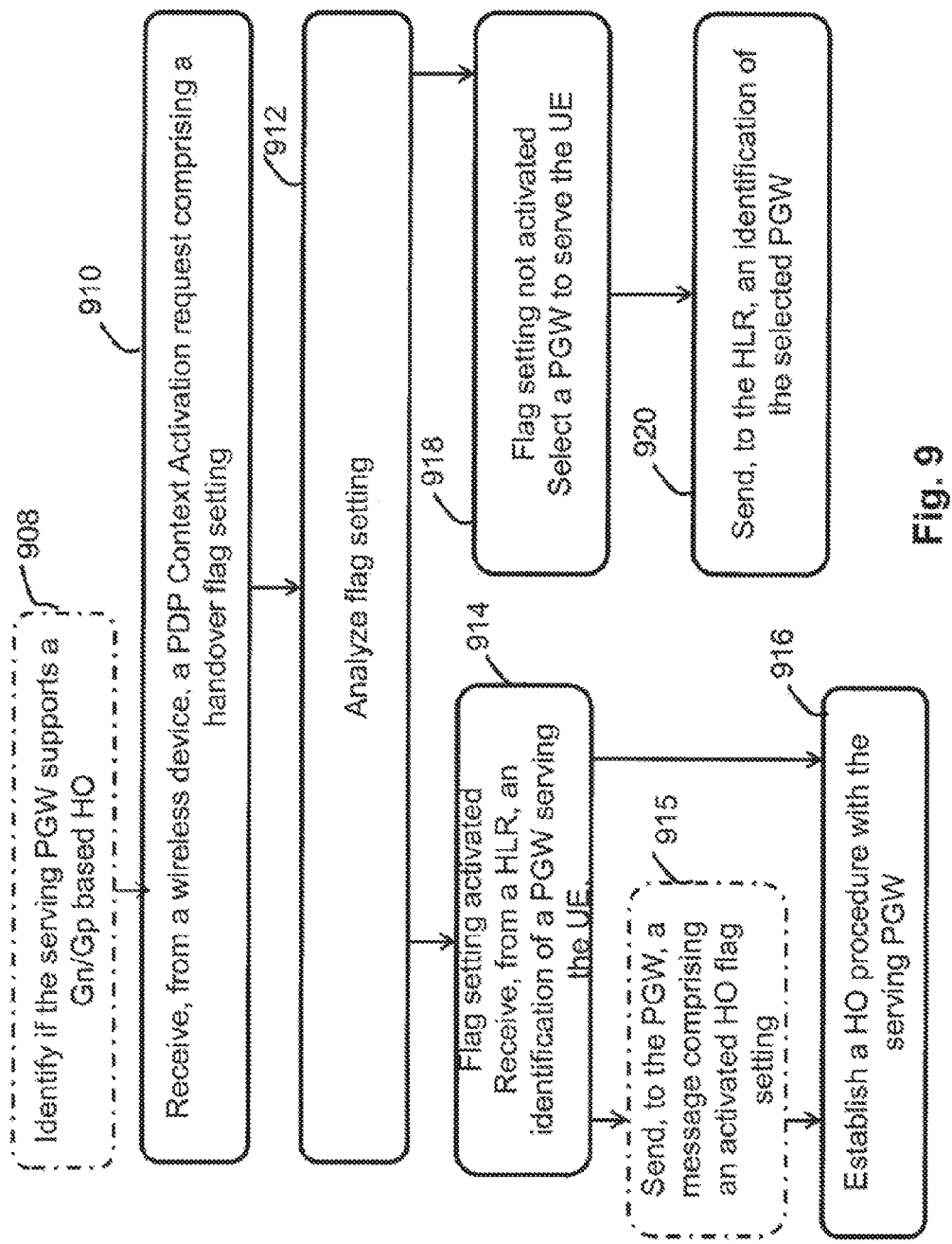
FIG. 9 is a flow diagram of example operations which may be taken by the Gn/Gp SGSN of FIG. 6, according to some of the example embodiments.

FIG. 9 is a flow diagram depicting example operations which may be taken by the Gn/Gp SGSN 111 as described herein for handover management. The Gn/Gp SGSN 111 may be the Gn/Gp SGSN of FIG. 6. It should also be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

The example embodiments presented herein provide a means for allowing a handover between WiFi and 2G/3G using a Gn/Gp SGSN 111 where the connectivity (e.g. PGW context, pre-existing IP address, etc.) with a previously serving PGW 119 may be maintained. Thus, the example embodiments prevent the need of continuously establishing a new session after a handover procedure.

It shall be appreciated that a Gn/Gp SGSN 111 is a SGSN which supports the Gn/Gp interface. It should be appreciated that the example embodiments discussed herein for the SGSN 111 is with the use of Gn/Gp and not S4.

The method in FIG. 9 comprises at least some of the following steps, which steps may be performed in any suitable order than described below:

Step 908

The Gn/Gp SGSN 111 may identify if the serving PGW 119 supports a Gn/Gp based handover.

Step 910

The Gn/Gp SGSN 111 may receive, from a UE 101, a PDP Context Activation request message comprising a handover flag setting. The UE 101 has sent the PDP Context Activation Request message to Gn/Gp SGSN 111.

The Gn/Gp SGSN 111 sends the PGW 119 a message with the handover flag activated, and the PGW 119 receives the message from the Gn/Gp SGSN 111. If the Gn/Gp SGSN 111 receives a message back with the flag activated, the Gn/Gp SGSN 111 knows that the serving PGW 119 supports Gn/Gp handover and will therefore apply the example embodiments described herein rather than legacy methods where the Gn/Gp SGSN 111 creates a new PDP context for handover procedures instead of using the identification of a previously serving PGW 119.

Step 912

The Gn/Gp SGSN 111 may analyse the handover flag setting.

Step 914

If the analyze of the handover flag in step 912 indicates that the flag setting is activated, the Gn/Gp SGSN 111 may receive, from the HLR 135, an identification of a PGW 119 serving the UE 101. The HLR 135 has sent the Identification of the PGW 119 to the Gn/Gp SGSN 111.

It should further be appreciated that the received information described in step 914 is provided along with subscription data that is also received. It should be appreciated that the receiving of such information is not dependent on the flag setting. The Information may be received on a same information Element (IE) as the subscription data or on a separate IE. It should be appreciated that the identification of the PGW 119 and the subscription data need not be received in separate messages.

Step 915

If the analyze of the handover flag in step 912 indicates that the flag setting is activated, the Gn/Gp SGSN 111 may send, to the PGW 119 (the PGW 119 which was identified in step 914), a message comprising an activated handover flag setting. The PGW 119 receives the message from the Gn/Gp SGSN 111.

Step 916

If the analyze of the handover flag in step 912 indicates that the flag setting is activated, the Gn/Gp SGSN 111 may establish a handover procedure with the serving PGW 119, i.e. the PGW 119 to which the message in step 915 was transmitted.

Step 918

If the analyze of the handover flag in step 912 indicates that the flag setting is no activated, the Gn/Gp SGSN 111 may select a PGW 119 to serve the UE 101.

Step 920

If the analyze of the handover flag in step 912 indicates that the flag setting is not activated, the Gn/Gp SGSN 111 may send, to the HLR 135, an identification of the selected PGW 119 (the PGW 119 which was selected in step 918). The HLR 135 may receive the Identification of the selected PGW 119 from the Gn/Gp SGSN 111.

Figure 10:
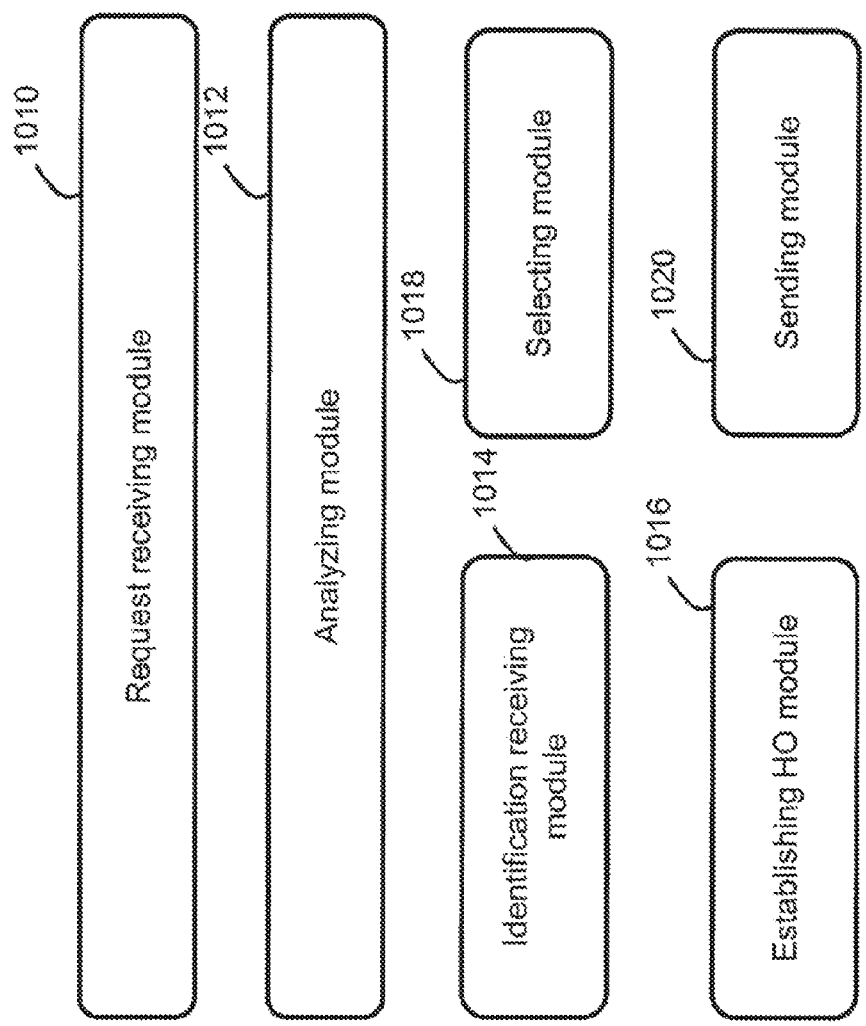
FIG. 10 is a module diagram of modules which may perform at least some of the operations illustrated in FIG. 9, according to some of the example embodiments.

FIG. 10 illustrates a module diagram illustrating various modules comprised in the Gn/Gp SGSN 111 which may be used in the implementation of the broadest embodiment of FIG. 9. The modules in FIG. 10 may perform at least some of the operations illustrated in FIG. 9. The Gn/Gp SGSN 111 may comprise least one of the following modules: a request receiving module 1010, an analyzing module 1012, an Identification receiving module 1014, an establishing handover module 1016, a selecting module 1018 and a sending module 1020. The request receiving module 101 and the identification receiving module 1014 may correspond to the receiving unit 601A in FIG. 6. The analyzing module, the establishing handover module 1016 and the selecting module 1018 may correspond to the processing unit 603 in FIG. 6. The sending module 1020 may correspond to the transmitting unit 601B in FIG. 6.

The example embodiments presented herein provide a means for allowing a handover between WiFi and 2G/3G using a Gn/Gp SGSN 111 where the connectivity (e.g. PGW context, pre-existing IP address, etc.) with a previously serving PGW 1119 may be maintained. Thus, the example embodiments prevent the need of continuously establishing a new session after a handover procedure.

It shall be appreciated that a Gn/Gp SGSN 111 is a SGSN which supports the Gn/Gp interface. It should be appreciated that the example embodiments discussed herein for the SGSN is with the use of Gn/Gp and not S4.

It should further be appreciated that the received identity of the PGW 119 is provided along with subscription data that is also received. It should be appreciated that the receiving of such information is not dependent on the flag setting. The Information may be received on a same IE as the subscription data or on a separate IE. It should be appreciated that the identification of the PGW and the subscription data need not be received in separate messages.

Figure 11:
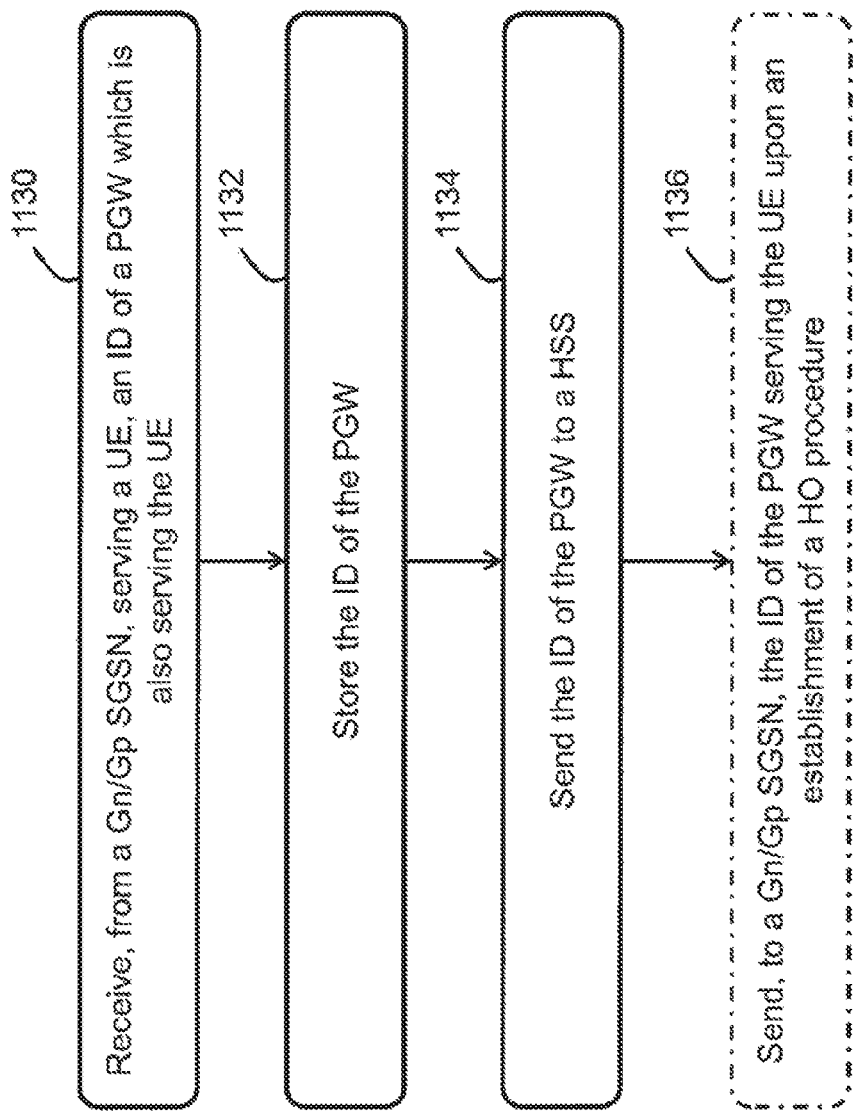
FIG. 11 is a flow diagram of example operations which may be taken by the HLR of FIG. 7, according to some of the example embodiments.

FIG. 11 is a flow diagram depicting example operations which may be taken by the HLR 135 as described herein for handover management. The HLR 135 may be the HLR 135 of FIG. 7. It should also be appreciated that FIG. 11 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

The method in FIG. 11 comprises at least some of the following steps, which steps may be performed in any suitable order than described below:

Step 1130

The HLR 135 may receive, from the Gn/Gp SGSN 111, serving the UE 101, an ID of the PGW 119 which is also serving the UE 101. The Gn/Gp SGSN 111 has sent the PGW ID to the HLR 135.

Step 1132

The HLR 135 may store the ID of the PGW 119.

Step 1134

The HLR 135 may send the ID of the PGW 119 to the HSS 121. The HSS 121 receives the PGW ID from the HLR 135.

Step 1136

The HLR 135 may send, to the Gn/Gp SGSN 111, the ID of the PGW 119 serving the UE 101 upon an establishment of a handover procedure. The Gn/Gp SGSN 111 may receive the PGW ID from the HLR 135.

According to some of the example embodiments, the sending may be performed with the use of an update location request message. It should also be appreciated that the HLR 135 may alternatively receive the Identification of the PGW 119 from the HSS 121. It should be appreciated that, according to some of the example embodiments, the HLR 135 need not store the identification of the PGW 119 but merely receive and then send the identification to the HSS 121.

Figure 12:
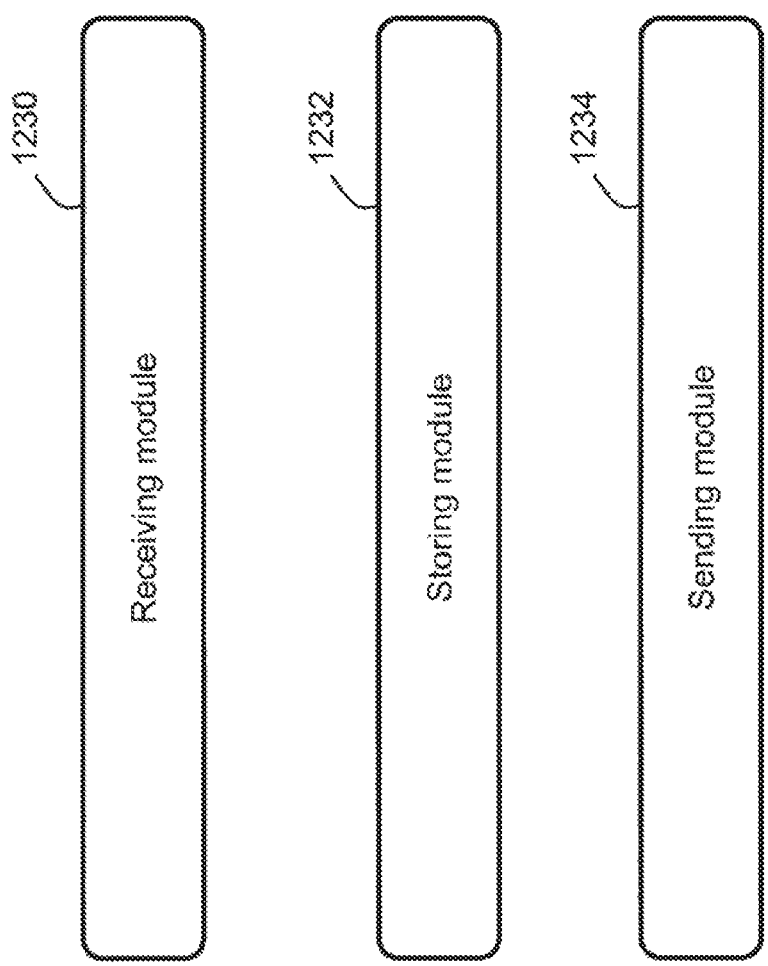
FIG. 12 is a module diagram of modules which may perform at least some of the operations illustrated in FIG. 11, according to some of the example embodiments.

FIG. 12 illustrates a module diagram illustrating various modules comprised in the HLR 135 which may be used in the implementation of the broadest embodiment of FIG. 11. The modules in FIG. 12 may perform at least some of the operations illustrated in FIG. 11. The HLR 135 may comprise at least one of the following modules: receiving module 1230, storing module 1232 and sending module 1234. The receiving module 1230 may correspond to the receiving unit 701A in FIG. 7. The storing module 1232 may correspond to the memory 705 in FIG. 7. The sending module 1234 may correspond to the transmitting unit 701b in FIG. 7.

Figure 13:
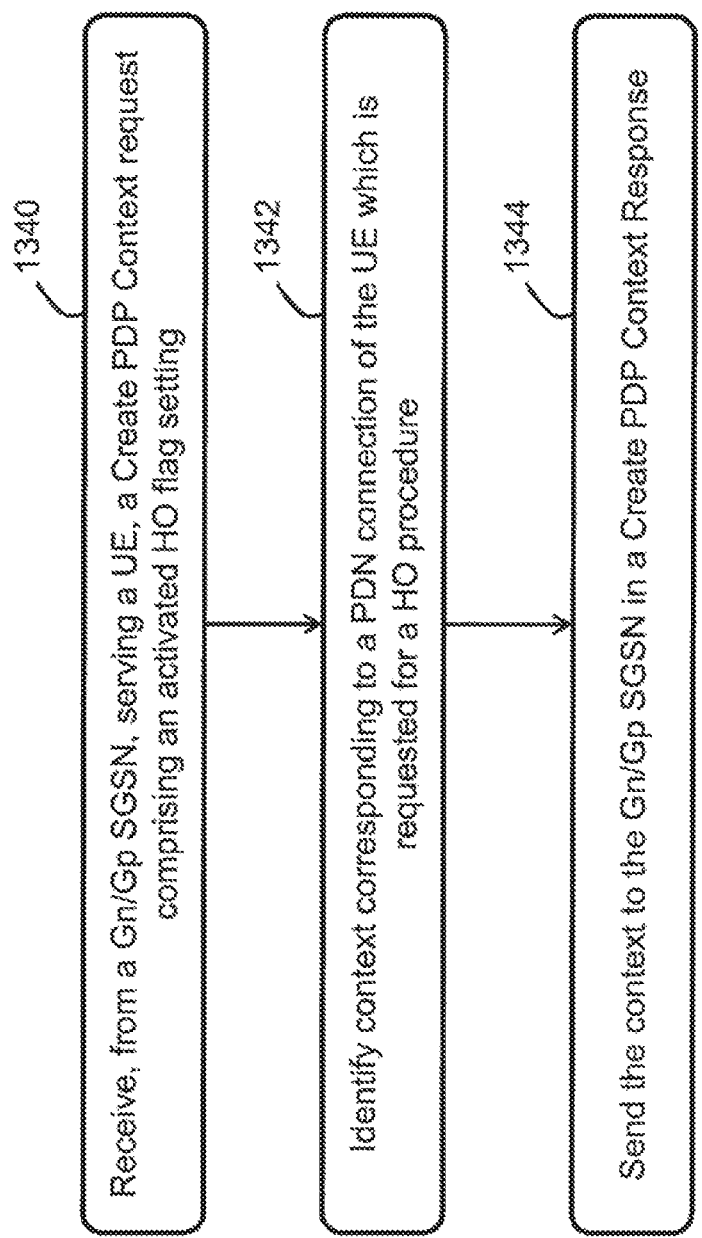
FIG. 13 is a flow diagram of example operations which may be taken by the PGW of FIG. 8, according to some of the example embodiments.

FIG. 13 is a flow diagram depicting example operations which may be taken by the PGW 119 as described herein for handover management. It should also be appreciated that FIG. 13 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The method in FIG. 13 comprises at least some of the following steps, which steps may be performed in any suitable order than described below:

Step 1340

The PGW 119 may receive, from the Gn/Gp SGSN 111, serving the UE 101, a Create PDP Context Request message comprising an activated handover flag setting. The Gn/Gp SGSN 111 has sent the Create PDP Context Request message to the PGW 119.

Step 1342

The PGW 119 may identify context corresponding to the PDN connection of the UE 101 which is requested for the handover procedure.

Step 1344

The PGW 119 may send at least part of the context to the Gn/Gp SGSN 111 in a Create PDP Context Response message. The Gn/Gp SGSN 111 receives the at least part of the context in the Create PDP Context Response message. The Gn/Gp SGSN 11 may receive the at least part of the context from the PGW 119.

Figure 14:
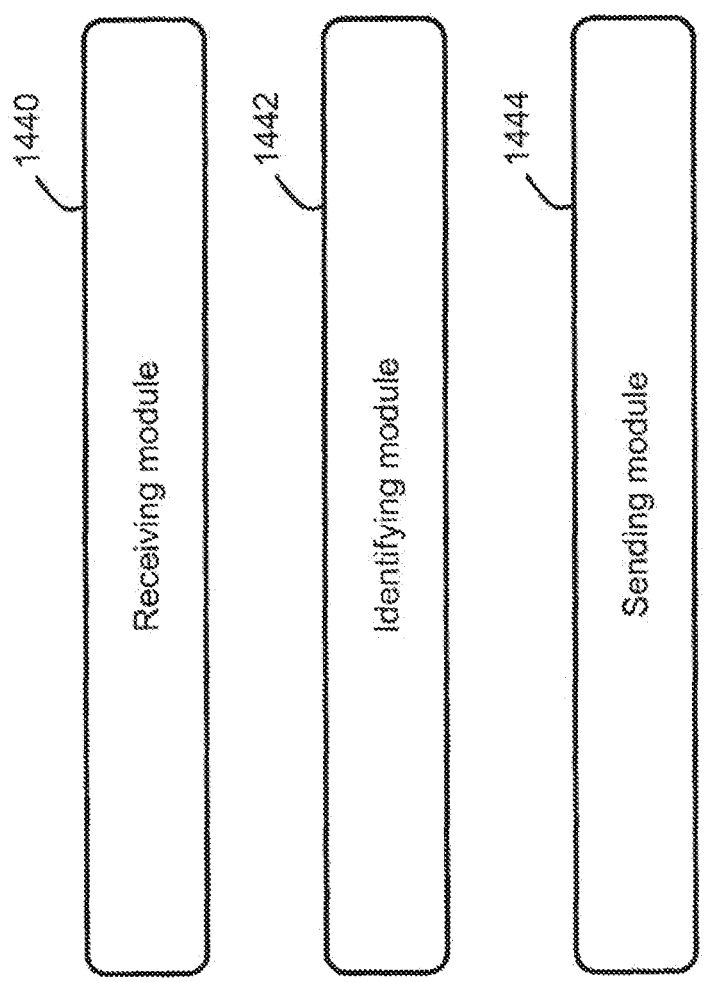
FIG. 14 is a module diagram of modules which may perform at least some of the operations illustrated in FIG. 13, according to some of the example embodiments.

FIG. 14 illustrates a module diagram illustrating various modules comprised in the PGW 119 which may be used in the Implementation of the broadest embodiment of FIG. 13. The modules in FIG. 14 may perform at least some of the operations illustrated in FIG. 13. The PGW 119 may comprise at least one of the following modules: receiving module 1440, identifying module 1442 and sending module 1444. The receiving module 1440 may correspond to the receiving unit 801A in FIG. 8. The identifying module 1442 may correspond to the processing unit 803 in FIG. 8. The sending module 1444 may correspond to the transmitting unit 801B in FIG. 8.

Further example embodiments comprise a method for establishing a communication session from the UE 101 to the 3GPP access 125. The method comprising establishing, through the 3GPP access 125, the communication session between the UE 101 and the PGW 119 where the Gn/Gp interface is used between the Gn/Gp SGSN 111 and the PGW 119. The method further comprising that the Gn/Gp SGSN 111 provides information (e.g. the PGW ID) related to 3GPP-WLAN mobility to the HLR 135.

Further example embodiments also comprise a method in the Gn/Gp SGSN 111 for performing a handover of a communication session from a non-3GPP access 123 to a 3GPP access 125. The method comprises establishing, through either the 3GPP access 125 or the non-3GPP access 123, the communication session between the UE 101 and the PGW 119. During the handover of the communication session from non-3GPP access 123 to GERAN/UTRAN access 102, 103, the Gn/Gp SGSN 111 receives a request from the UE 101 to handover an existing connection. The Gn/Gp SGSN 111 receives information related to 3GPP-WLAN mobility from the HLR 135, and the Gn/Gp SGSN 111 provides information over the Gn/Gp to the PGW 119 to indicate that the request is referring to handover of an existing connection Yet further example embodiments comprise a method in the PGW 119 for performing a handover of a communication session from the non-3GPP access 123 to the 3GPP access 125. The method comprises establishing, through either the 3GPP access 125 or the non-3GPP access 123, the communication session between the UE 101 and the PGW 119. During the handover of the communication session from the non-3GPP access 123 to the GERAN/UTRAN access 102, 103, the PGW 119 receives a request from the Gn/Gp SGSN 111 over the Gn/Gp to handover an existing connection. The PGW 119 identifies the exiting PDN connection session corresponding to the non-3GPP access 123. The PGW 119 preforms the handover of the communication session to the PDP context session towards the Gn/Gp SGSN 111.

Another example embodiment comprises a method in the PGW 119 for performing a handover of a communication session from the GERAN/UTRAN access 102, 103 to the non-3GPP access 123. The method comprises establishing, through either the 3GPP access 125 or the non-3GPP access 123, the communication session between the UE 101 and the PGW 119. During the handover of the communication session from GERAN/UTRAN access 102, 103 to non-3GPP access 123, the PGW 119 receives a request from the non-3GPP access 123 to handover an existing connection. The PGW 119 identifies the exiting PDP context session corresponding to the source GERAN/UTRAN access 102, 103. The PGW 119 preforms the handover of the communication session to the PDN connection session towards the non-3GPP access 123.

Figure 15A:
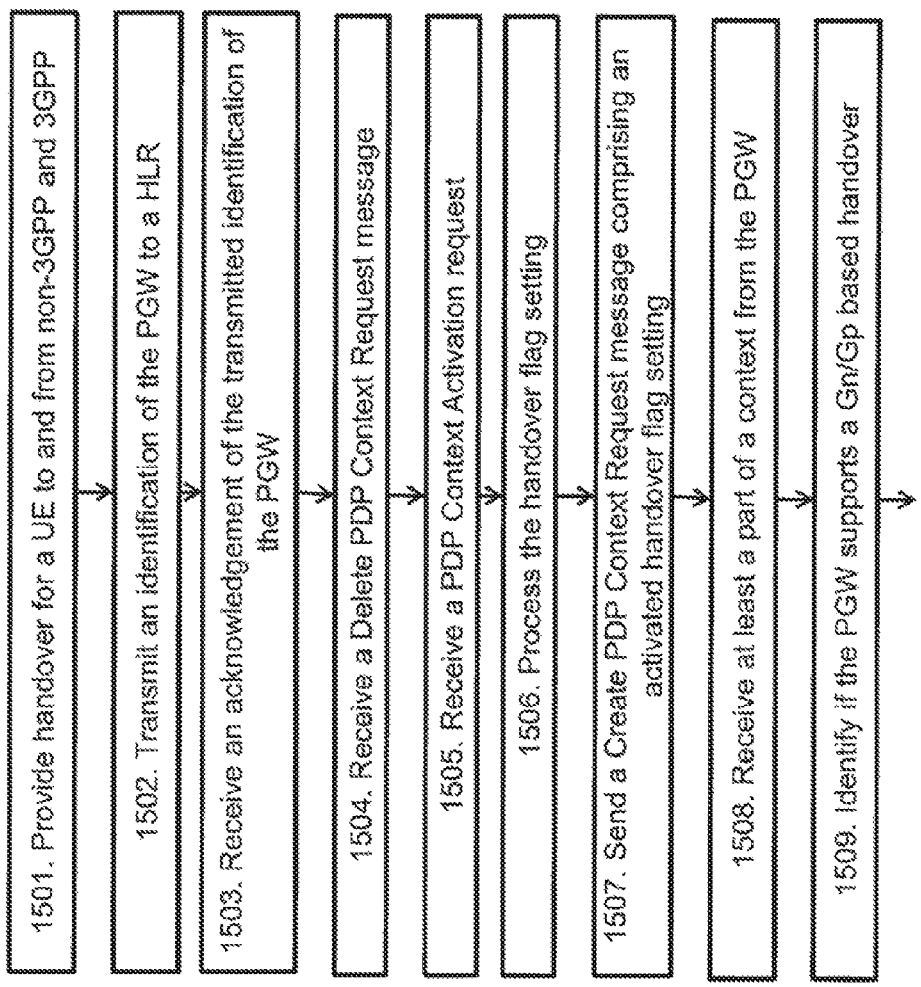
FIGS. 15a-b are flow charts illustrating example embodiments of a method performed by a Gn/Gp SGSN.
Figure 15B:
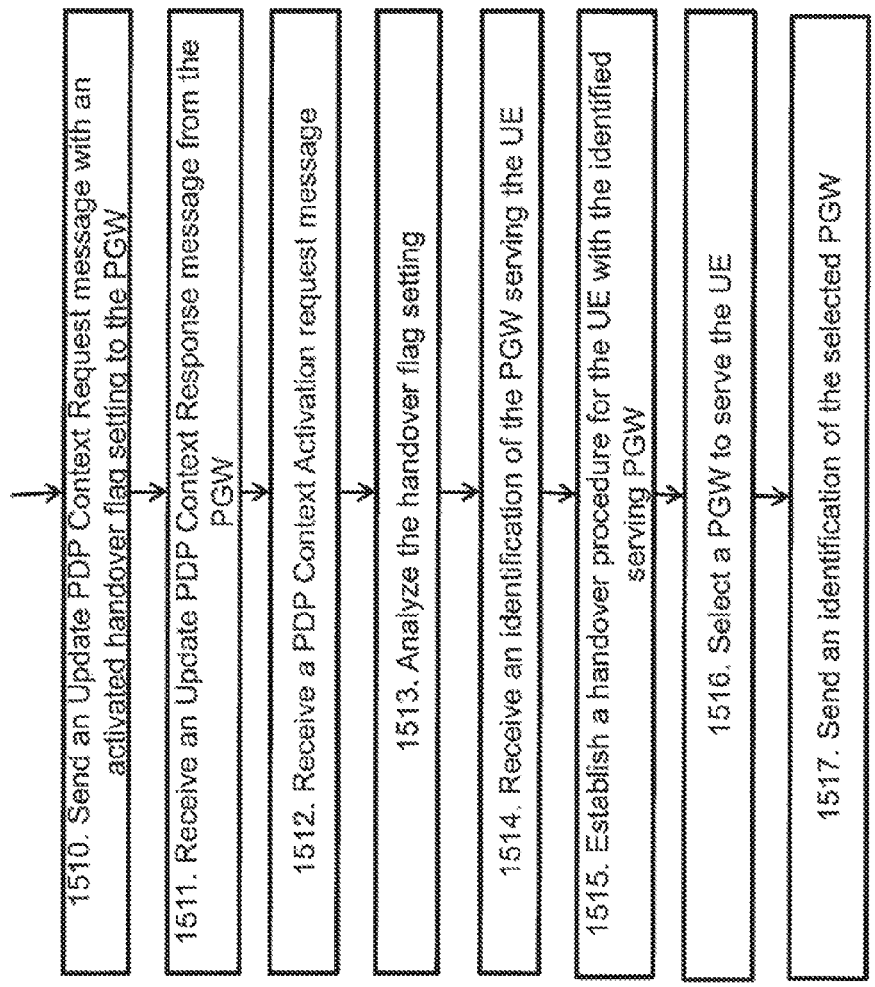

The method described above will now be described seen from the perspective of the Gn/Gp SGSN 111. FIGS. 15a and 5b are flowcharts describing the present method performed by the Gn/Gp SGSN 111 for providing handover management. FIG. 15b is a continuation of FIG. 15a. FIG. 15a comprises steps 1501-1509 and FIG. 15b comprises steps 1510-1517. The Gn/Gp SGSN 111 may be configured for operation in a wireless network. The handover may be from GERAN/UTRAN to WiFi, or from WiFi to GERAN/UTRAN, or from GERAN/UTRAN to E-UTRAN, and then to WiFi. The method comprises at least some of the following steps to be performed by the Gn/Gp SGSN 111, which steps may be performed in any suitable order than described below:

Step 1501

This step is seen in FIG. 15a. The Gn/Gp SGSN 111 provides a handover for a UE 101 to and from non-3GPP and 3GPP by utilizing a PDP context that was previously created for the UE 101 during an attach procedure. The previously created PDP context is for a previously serving PGW 119.

Step 1502

This step is seen in FIG. 15a. This step corresponds to step 314 in FIG. 3. The Gn/Gp SGSN 111 may transmit an identification of the PGW 119 to a HLR 135 at a PDN connection establishment.

Step 1503

This step is seen in FIG. 15a. This step corresponds to step 316 in FIG. 3. The Gn/Gp SGSN 111 may receive an acknowledgement of the transmitted identification of the PGW 119 from the HLR 135.

Step 1504

This step is seen in FIG. 15a. This step corresponds to step 406 in FIG. 4. The Gn/Gp SGSN 111 may receive, from the PGW 119, a Delete PDP Context Request message. The Delete PDP Context Request message comprises an indication that a radio access type of the UE 101 has changed from 3GPP to non-3GPP.

The receiving, from the PGW 119, of the Delete PDP Context Request message may be repeated for several PDP contexts which correspond to a PDN connection handed over to non-3GPP.

The message described in step 1504 may be message 406 of the FIG. 4 entitled 'UTRAN/GERAN to WiFi Handover based on Gn/Gp SGSN'.

Step 1505

This step is seen in FIG. 15*a*. This step corresponds to step 509 in FIG. 5 and step 910 in FIG. 9. The Gn/Gp SGSN 111 may receive, from the UE 101, a PDP Context Activation Request message. The PDP Context Activation Request message comprising a handover flag setting.

Step 1506

Figure 1:
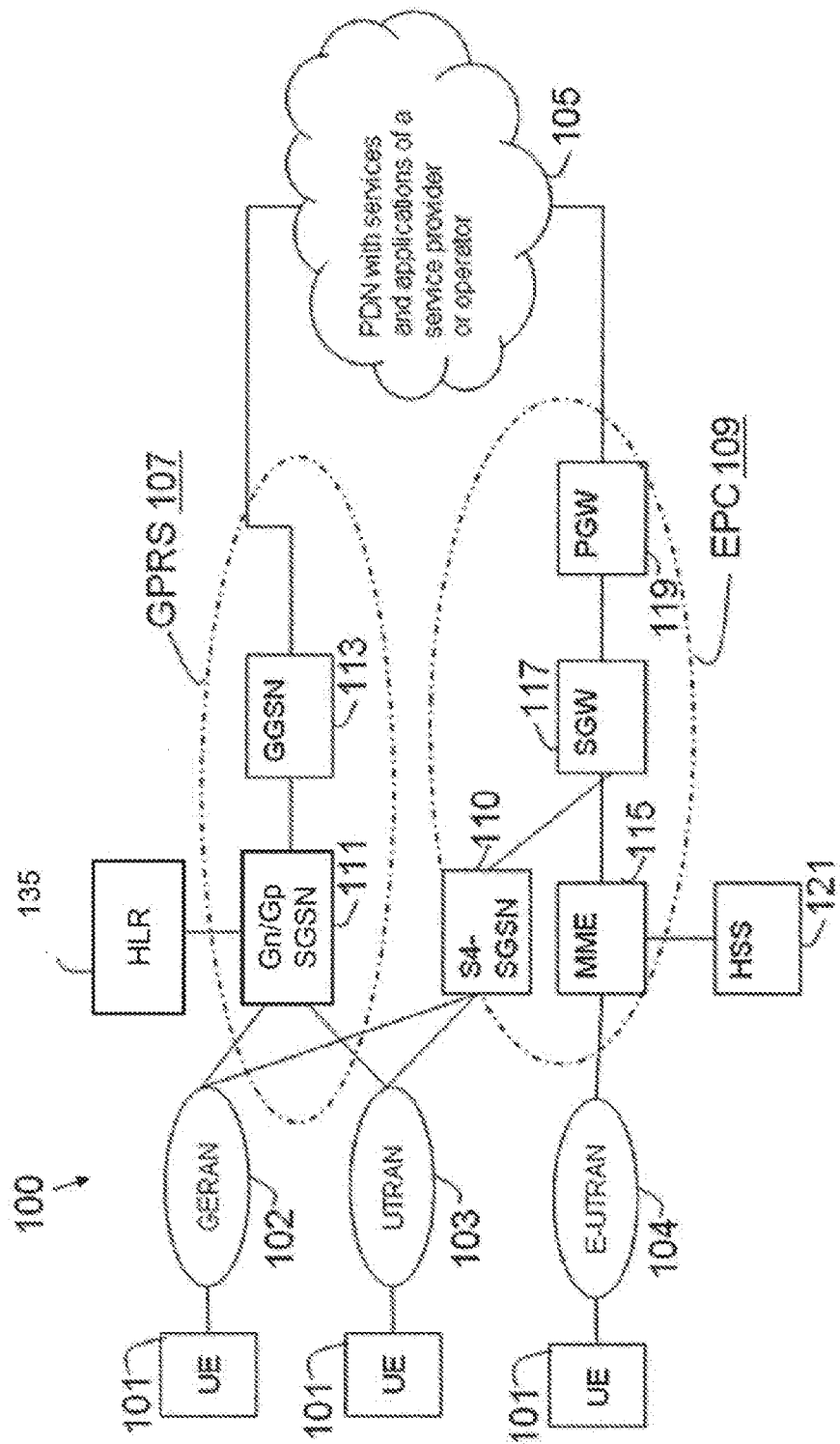
FIG. 1 is an example of a wireless communications network.
Figure 2A:
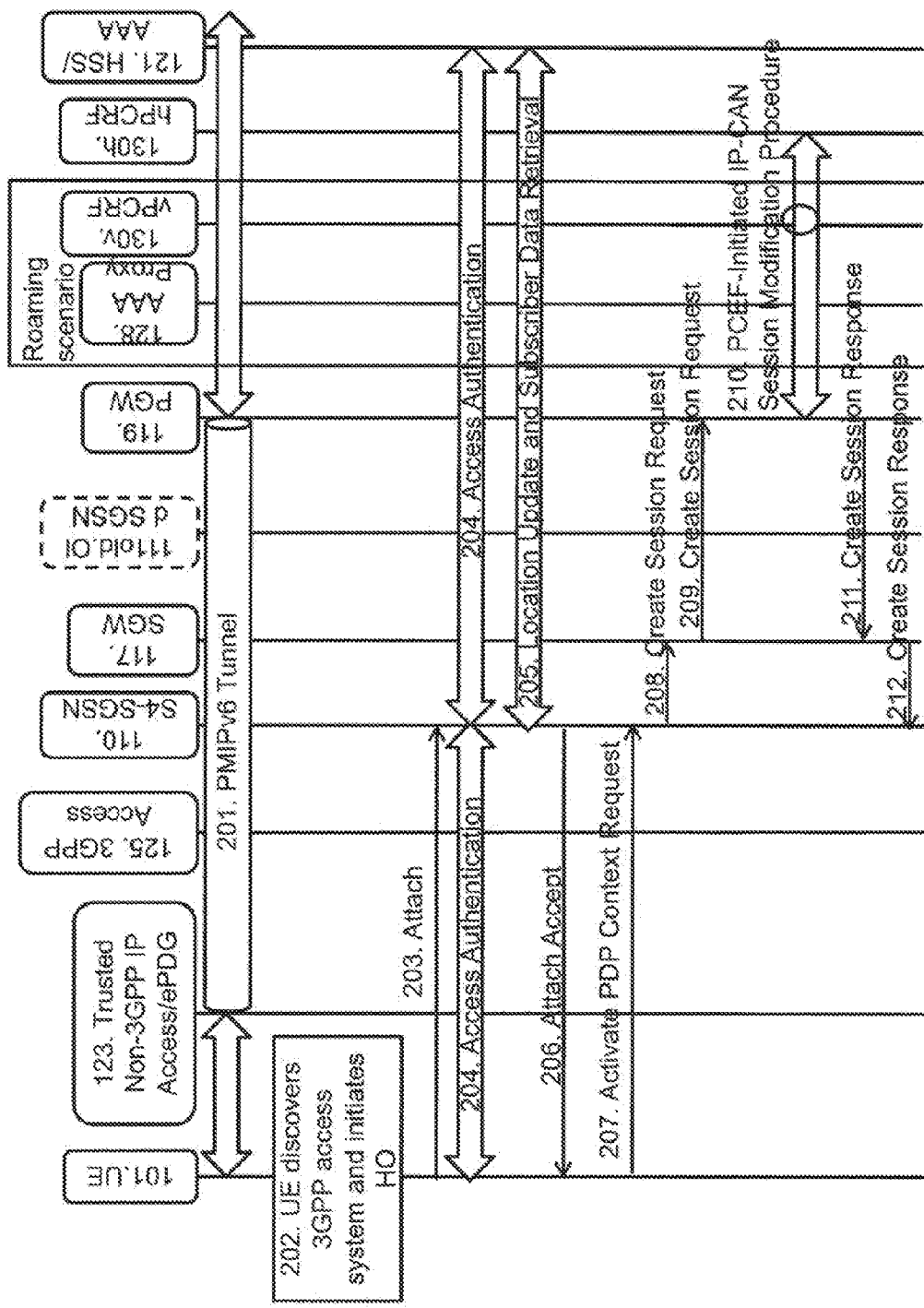
FIG. 2 is a message passing diagram of a handover from non-3GPP access to UTRAN/GERAN.
Figure 2B:
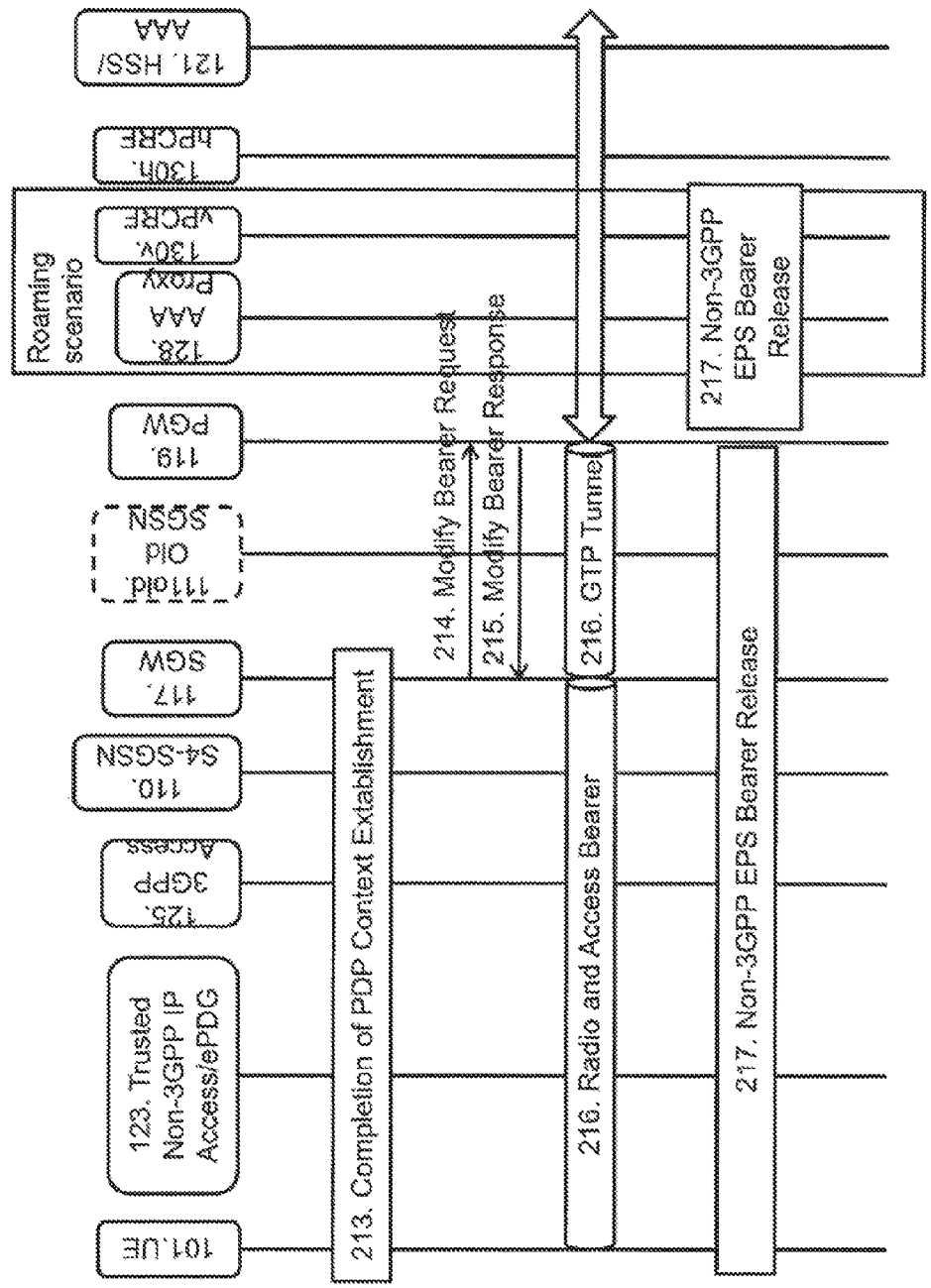

This step is seen in FIG. 15*a*. This step corresponds to step 912 in FIG. 2. This step may be the same as step 1513 in FIG. 15*b*. The Gn/Gp SGSN 111 may process the handover flag setting.

Step 1507

This step is seen in FIG. 15*a*. This step corresponds to step 510 in FIG. 5. The Gn/Gp SGSN 111 may send, to the PGW 119, a Create PDP Context Request message comprising an activated handover flag setting. The activated handover flag setting indicates a handover request for the UE 101. The handover is a non-3GPP to 3GPP handover.

An example of the message in step 1507 may be message 510 in the FIG. 5 entitled 'UTRAN/GERAN handover based on Gn/Gp SGSN.

Step 1508

This step is seen in FIG. 15*a*. This step corresponds to step 511 in FIG. 5. The Gn/Gp SGSN 111 may receive at least a part of a context from the PGW 119 in a Create PDP Context Response message to accept a handover request for the UE 101. The context corresponds to a PDN connection of the UE 101 which is requested for the handover.

Step 1509

This step is seen in FIG. 15*a*. This step corresponds to step 908 in FIG. 9. Based on a communication previously received from the PGW 119, the Gn/Gp SGSN 111 may identify if the PGW 119 supports a Gn/Gp based handover.

Step 1510

This step is seen in FIG. 15*b*. This step corresponds to step 513 in FIG. 5. If the Gn/Gp SGSN 111 learns that the PGW 119 can support the non-3GPP to 3GPP handover, the Gn/Gp SGSN 111 may send an Update PDP Context Request message with an activated handover flag setting to the PGW 119.

The Gn/Gp SGSN 111 may follow legacy behavior of PDP Activation if the Gn/Gp SGSN 111 learns that the PGW 119 cannot support the non-3GPP to 3GPP handover.

Step 1511

This step is seen in FIG. 15*b*. This step corresponds to step 515 in FIG. 5. The Gn/Gp SGSN 111 may receive an Update PDP Context Response message from the PGW 119.

Step 1512

This step is seen in FIG. 15*b*. This step corresponds to step 307 in FIG. 3, step 509 in FIG. 5 and step 910 in FIG. 9. The Gn/Gp SGSN 111 may receive, from the UE 10), a PDP Context Activation request message. The PDP Context Activation Request message comprising a handover flag setting.

Step 1513

This step is seen in FIG. 15*b*. This step corresponds to step 912 in FIG. 9. This step may be the same as step 1506 in FIG. 15*a*. The Gn/Gp SGSN 111 may analyze the handover flag setting.

Step 1514

This step is seen in FIG. 15*b*. This step corresponds to step 914 in FIG. 9. If the handover flag setting is activated, the Gn/Gp SGSN 111 may receive, from a HLR 135 an identification of the PGW 119 serving the UE 101.

Step 1515

This step is seen in FIG. 15*b*. This step corresponds to step 916 in FIG. 9. The Gn/Gp SGSN 111 may establish a handover procedure for the UE 101 with the identified serving PGW 119.

Step 1516

This step is seen in FIG. 15*b*. This step corresponds to step 918 in FIG. 9. If the handover flag setting is not activated, the Gn/Gp SGSN 111 may select a PGW 119 to serve the UE 101.

Step 1517

This step is seen in FIG. 15*b*. This step corresponds to step 314 in FIG. 3 and step 920 in FIG. 9. The Gn/Gp SGSN 111 may send, to the HLR 135, an identification of the selected PGW 119. The identification of the PGW 119 may be a PGW Fully Qualified Domain Name (FQDN), a PGW IP address, an APN and/or a PLMN identification. The identification of the PGW 119 serving the wireless device 101 or the selected PGW may be a FQDN, a PGW IP address, an APN, and/or a PLMN identification.

The message described in step 1517 is message 406 of the FIG. 4 entitled 'UTRAN/GERAN to WiFi Handover based on Gn/Gp SGSN'.

The receiving in step 1514 and the establishing in step 1515 may further comprises sending, to the serving PGW 119, a Create PDP Context Request message comprising an activated handover flag setting. An example of this is message 510 in the FIG. 5 entitled 'UTRAN/GERAN handover based on Gn/Gp SGSN.

Figure 16:
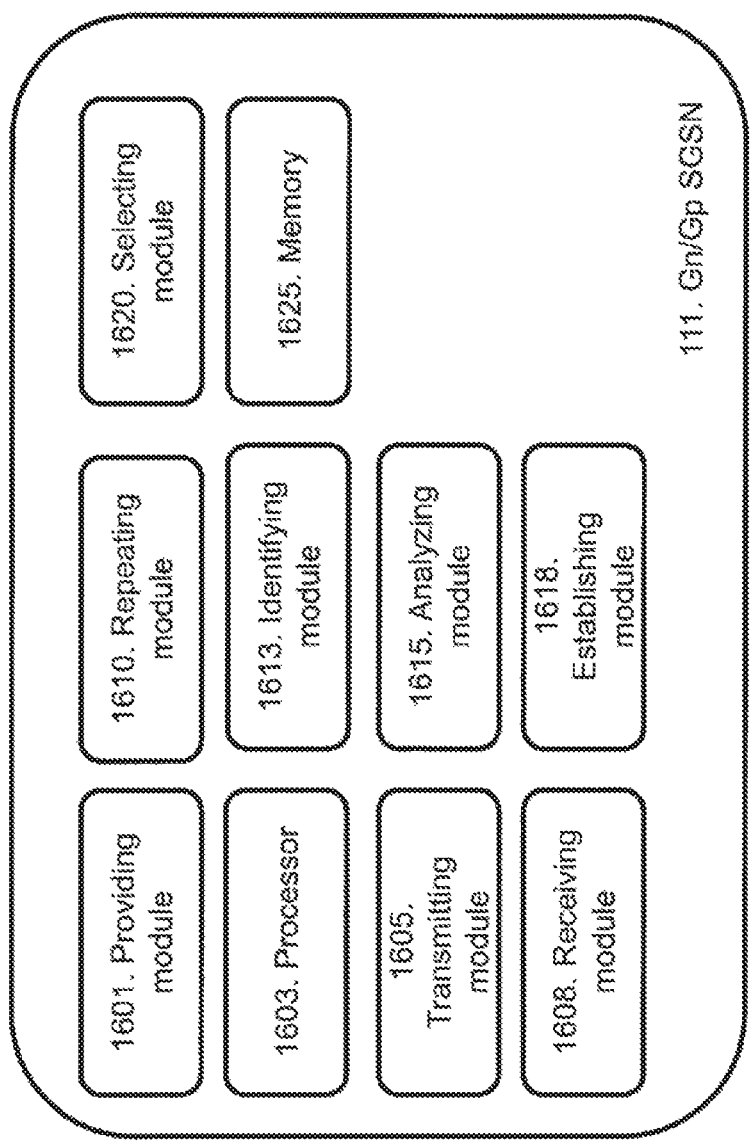
FIG. 16 is a schematic block diagram illustrating example embodiments of a Gn/Gp SGSN.

To perform the method steps shown in FIG. 15 for providing handover management, the Gn/Gp SGSN 111 may comprise an arrangement as shown in FIG. 16. The handover may be from GERAN/UTRAN to WiFi or from WiFi to GERAN/UTRAN, or from GERAN/UTRAN to E-UTRAN, and then to WiFi.

To perform the method steps shown in FIG. 15 for providing handover management, the Gn/Gp SGSN 111 is adapted to, e.g. by means of a providing module 1601, provide a handover for a UE 101 to and from non-3GPP and 3GPP by utilizing a PDP context that was previously created for the UE 101 during an attach procedure. The previously created PDP context is for a previously serving PGW 119. The providing module 1601 may also be referred to as a providing unit, a providing means, a providing circuit, means for providing etc. The providing module 1601 may be a processor 1603 of the Gn/Gp SGSN 111. The providing module 1601 of FIG. 16 may correspond to the processing unit 803 of FIG. 8. The processor 1603 of FIG. 16 may correspond to the processing unit 803 of FIG. 8.

The Gn/Gp SGSN 111 may be further adapted to, e.g. by means of a transmitting module 1605, transmit an identification of the PGW 119 to a HLR 135 at a PDN connection establishment. The transmitting module 1605 may also be referred to as a transmitting unit, a transmitting means, a transmitting circuit, means for transmitting, output unit etc. The transmitting module 1605 may be a transmitter, a transceiver etc. The transmitting module 1605 may be a wireless transmitter of the Gn/Gp SGSN 111 of a wireless or fixed communications system. The transmitting module 1605 of FIG. 16 may correspond to the transmitting unit 801B of FIG. 8 and the sending module 1444 of FIG. 14.

The Gn/Gp SGSN 111 may be further adapted to, e.g. by means of a receiving module 1608, receive an acknowledgement of the transmitted identification of the PGW 119 from the HLR 135. The receiving module 1608 may also be referred to as a receiving unit, a receiving means, a receiving circuit, means for receiving, input unit etc. The receiving module 1608 may be a receiver, a transceiver etc. The receiving module 1608 may be a wireless receiver of the Gn/Gp SGSN 111 of a wireless or fixed communications system. The receiving module 1608 of FIG. 16 may correspond to the receiving unit 801A of FIG. 8 and the receiving module 1440 of FIG. 14.

The Gn/Gp SGSN 111 may be further adapted to, e.g. by means of the receiving module 1608, receive from the PGW 119, a Delete PDP Context Request message. The Delete PDP Context Request message may comprise an indication that a radio access type of the UE 101 has changed from 3GPP to non-3GPP.

The Gn/Gp SGSN 111 may be further adapted to, e.g. by means of a repeating module 1610, repeat the receiving, from the PGW 119, of the Delete PDP Context Request message for several PDP contexts which corresponds to a PDN connection handed over to non-3GPP. The repeating module 1610 may also be referred to as a repeating unit, a repeating means, a repeating circuit, means for repeating etc. The repeating module 1610 may be the processor 1603 of the Gn/Gp SGSN 111. The repeating module 1610 of FIG. 16 may correspond to the processing unit 803 of FIG. 8.

The Gn/Gp SGSN 111 may be further adapted to, e.g. by means of the receiving module 1608, receive, from the UE 101, a PDP Context Activation request message. The PDP Context Activation request message may comprise a handover flag setting.

The Gn/Gp SGSN 11 may be further adapted to, e.g. by means of the processor 1603, process the handover flag setting.

The Gn/Gp SGSN 111 may be further adapted to, e.g. by means of the transmitting module 1605, send, to the PGW 119, a Create PDP Context Request message comprising an activated handover flag setting. The activated handover flag setting may indicate a handover request for the UE 101. The handover may be a non-3GPP to 3GPP handover.

The Gn/Gp SGSN 111 may be further adapted to, e.g. by means of the receiving module 1608, receive at least a part of a context from the PGW 119 in a Create PDP Context Response message to accept a handover request for the UE 101. The context may correspond to a PDN connection of the UE 101 which is requested for the handover.

The Gn/Gp SGSN 111 may be further adapted to, e.g. by means of a Identifying module 1613, identify, based on a communication previously received from the PGW 119, if the PGW 119 supports a Gn/Gp based handover. The identifying module 1613 may also be referred to as an identifying unit, an identifying means, an identifying circuit, means for identifying etc. The identifying module 1613 may be the processor 1603 of the Gn/Gp SGSN 111. The identifying module 1613 of FIG. 16 may correspond to the processing unit 803 of FIG. 8 and the identifying module 1442 of FIG. 14.

The Gn/Gp SGSN 111 may be further adapted to, e.g. by means of the transmitting module 1605, send an Update PDP Context Request message with an activated handover flag setting to the PGW 119 if the Gn/Gp SGSN 111 learns that the PGW 119 can support the non-3GPP to 3GPP handover. The Gn/Gp SGSN 111 may be adapted to follow legacy behavior of PDP Activation if the Gn/Gp SGSN 111 learns that the PGW 119 cannot support the non-3GPP to 3GPP handover.

The Gn/Gp SGSN 111 may be further adapted to, e.g. by means of the receiving module 1608, receive an Update PDP Context Response message from the PGW 119.

The Gn/Gp SGSN 111 may be further adapted to, e.g. by means of the receiving module 1608, receive, from the UE 101, a PDP Context Activation Request message. The PDP Context Activation Request message may comprise a handover flag setting.

The Gn/Gp SGSN 111 may be further adapted to, e.g. by means of an analyzing module 1615, analyze the handover flag setting. The analyzing module 1615 may also be referred to as an analyzing unit, an analyzing means, an analyzing circuit, means for analyzing etc. The analyzing module 1615 may be the processor 1603 of the Gn/Gp SGSN 111. The analyzing module 1615 of FIG. 16 may correspond to the processing unit 803 of FIG. 8.

The Gn/Gp SGSN 111 may be further adapted to, e.g. by means of the receiving module 1608, if the handover flag setting is activated, receive, from a HLR 135 an identification of the PGW 119 serving the UE 101.

The Gn/Gp SGSN 111 may be further adapted to, e.g. by means of an establishing module 1618, establish a handover procedure for the UE 101 with the identified serving PGW 119. The establishing module 1618 may also be referred to as an establishing unit, an establishing means, an establishing circuit, means for establishing etc. The establishing module 1618 may be the processor 1603 of the Gn/Gp SGSN 111. The establishing module 1618 of FIG. 16 may correspond to the processing unit 803 of FIG. 8.

The Gn/Gp SGSN 111 may be further adapted to, e.g. by means of an selecting module 1620, select, if the handover flag setting is not activated, a PGW 119 to serve the UE 101. The selecting module 1620 may also be referred to as a selecting unit, a selecting means, a selecting circuit, means for selecting etc. The selecting module 1620 may be the processor 1603 of the Gn/Gp SGSN 111. The selecting module 1620 of FIG. 16 may correspond to the processing unit 803 of FIG. 8.

The Gn/Gp SGSN 111 may be further adapted to, e.g. by means of the transmitting module 1605, send, to the HLR 135, an identification of the selected PGW 119. The identification of the PGW 119 may be a FQDN, a PGW IP, address, an APN, and/or a PLMN identification.

The Gn/Gp SGSN 111 may be further adapted to, e.g. by means of the transmitting module 1605, send, to the serving PGW 119, a Create PDP Context Request message comprising an activated handover flag setting.

The Gn/Gp SGSN 111 may further comprise a memory 1625 comprising one or more memory units. The memory 1625 is arranged to be used to store data, received data streams, power level measurements, handover flag, handover flag setting, request messages, response messages, contexts, acknowledgements, PGW ID, indications of that the RAT type has changed, information indicating the selected PGW, threshold values, time periods, configurations, schedulings, and applications to perform the methods herein when being executed in the Gn/Gp SGSN 111. The memory 1625 comprises instructions executable by the processor 1603. The memory 1625 of FIG. 16 may correspond to the memory 805 in FIG. 8.

Those skilled in the art will also appreciate that the providing module 1601, the transmitting module 1605, the receiving module 1608, the repeating module 1610, the identifying module 1613, the analysing module 1615, the establishing module 1618 and the selecting module 1620 described above may refer to a combination of analog and digital circuits, and/or one or more processors configured with software and/or firmware, e.g. stored in a memory, that when executed by the one or more processors such as the processor 1603 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a first computer program may comprise instructions which, when executed on at least one processor, cause the at least one processor to carry out the method steps 1501-1517. A first carrier may comprise the first computer program, and the first carrier is one of an electronic signal, optical signal, radio signal or computer readable storage medium.

Figure 17:
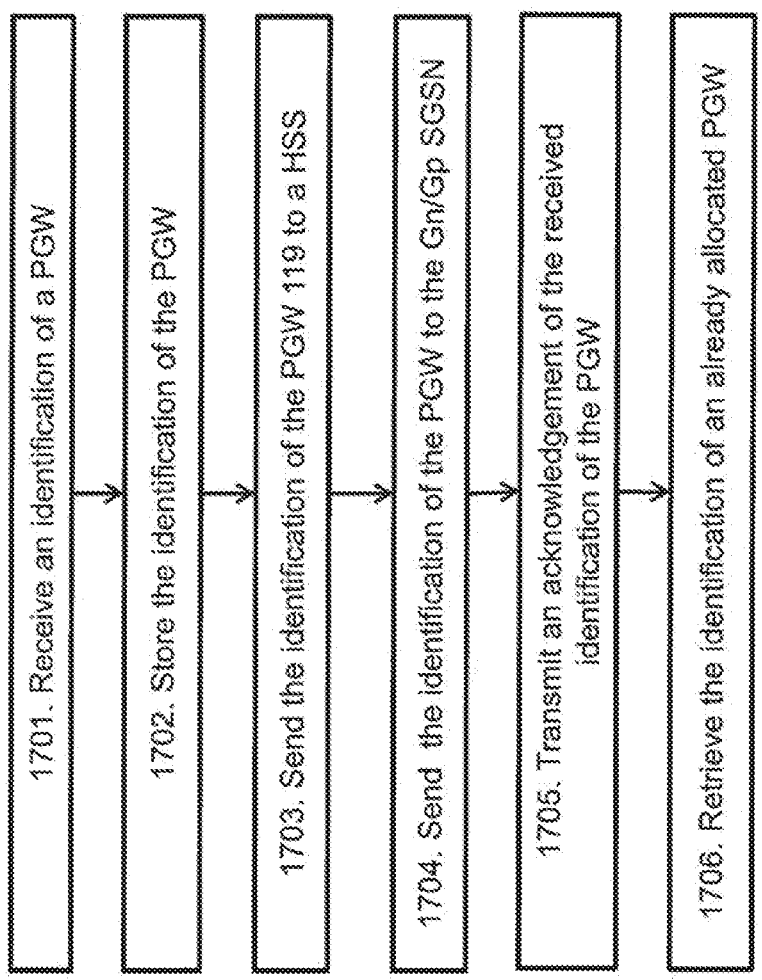
FIG. 17 is a flow chart illustrating example embodiments of a method performed by a HLR.

The method described above will now be described seen from the perspective of the HLR 135. FIG. 17 is a flowchart describing the present method performed by the HLR 135 for providing handover management. The handover may be from GERAN/UTRAN to WiFi, or from WiFi to GERAN/UTRAN, or from GERAN/UTRAN to E-UTRAN, and then to WiFi. The HLR 135 may be configured for operation in a wireless network. The method comprises at least some of the following steps to be performed by the HLR 135, which steps may be performed in any suitable order than described below:

Step 1701

This step corresponds to step 314 in FIG. 3 and step 1130 in FIG. 11. The HLR 135 receives, from a Gn/Gp SGSN 111 an identification of a PGW 119 at a PDN connection establishment.

Step 1702

This step corresponds to step 1132 in FIG. 11. The HLR 135 stores the identification of the PGW 119.

Step 1703

This step corresponds to step 315 in FIG. 3 and step 1134 in FIG. 11. The HLR 135 sends the identification of the PGW 119 to a HSS 121.

Step 1704

This step corresponds to step 1136 in FIG. 11. The HLR 135 may send, to the Gn/Gp SGSN 111, the identification of the PGW 119 serving the UE 101 upon an establishment of a handover procedure.

It should be appreciated that the Gn/Gp SGSN 111 of example step 1704 may or may not be the same Gn/Gp SGSN as described earlier, e.g. In relation to FIG. 15.

Step 1705

This step corresponds to step 316 in FIG. 3. The HLR 135 may transmit an acknowledgement of the received identification of the PGW 119 to the Gn/Gp SGSN 119.

Step 1706

This step corresponds to step 504 in FIG. 5. When the UE 101 has decided to handover from non-3GPP to 3GPP, the HLR 135 may retrieve the identification of an already allocated PGW 119 from a HSS 121. The identification of the PGW 119 may be a FQDN, a PGW IP address, an APN, and/or a PLMN identification.

Figure 18:
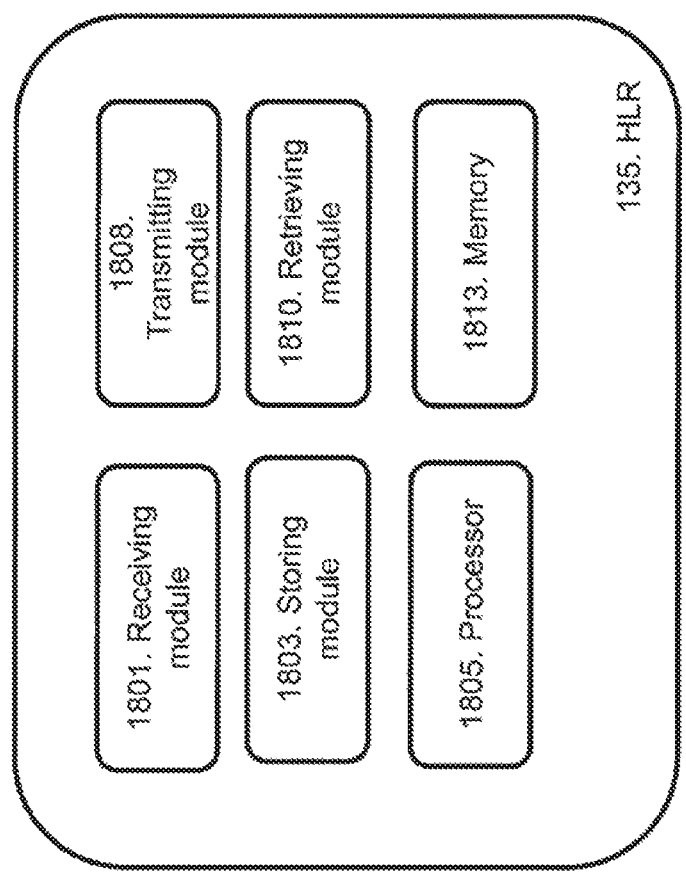
FIG. 18 is a schematic block diagram illustrating example embodiments of a HLR.

To perform the method steps shown in FIG. 17 for providing handover management, the HLR 135 may comprise an arrangement as shown in FIG. 18. The handover may be from GERAN/UTRAN to WiFi, or from WiFi to GERAN/UTRAN, or from GERAN/UTRAN to E-UTRAN, and then to WiFi.

To perform the method steps shown in FIG. 17 for providing handover management, the HLR 135 is adapted to, e.g. by means of a receiving module 1801, receive, from a Gn/Gp SGSN 111 an identification of a PGW 119 at a PDN connection establishment. The receiving module 1801 may also be referred to as a receiving unit, a receiving means, a receiving circuit, means for receiving, input unit etc. The receiving module 1801 may be a receiver, a transceiver etc. The receiving module 1801 may be a wireless receiver of the HLR 135 of a wireless or fixed communications system. The receiving module 1801 of FIG. 18 may correspond to the receiving unit 701A in FIG. 7 and the receiving module 1230 in FIG. 12.

The HLR 135 is further adapted to, e.g. by means of a storing module 1803, store the identification of the PGW 119. The storing module 1803 may also be referred to as a storing unit, a storing means, a storing circuit, means for storing etc. The storing module 1803 may be a processor 1805 of the HLR 135. The storing module 1803 of FIG. 18 may correspond to the processing unit 703 of FIG. 7 and the storing module 1232 of FIG. 12. The processor 1805 of FIG. 18 may correspond to the processing unit 703 in FIG. 7.

The HLR 135 is adapted to, e.g. by means of a transmitting module 1808, send the Identification of the PGW 119 to a HSS 121. The transmitting module 1808 may also be referred to as a transmitting unit, a transmitting means, a transmitting circuit, means for transmitting, output unit etc. The transmitting module 1808 may be a transmitter, a transceiver etc. The transmitting module 1808 may be a wireless transmitter of the HLR 135 of a wireless or fixed communications system. The transmitting module 1808 of FIG. 18 may correspond to the transmitting unit 701B of FIG. 7 and the sending module 1234 of FIG. 12.

The HLR 135 may be further adapted to, e.g. by means of the transmitting module 1808, send, to the Gn/Gp SGSN 111, the identification of the PGW 119 serving the UE 101 upon an establishment of a handover procedure.

The HLR 135 may be further adapted to, e.g. by means of the transmitting module 1808, transmit an acknowledgement of the received identification of the PGW 119 to the Gn/Gp SGSN 119.

The HLR 135 may be further adapted to, e.g. by means of a retrieving module 1810, retrieve, when the UE 101 has decided to handover from non-3GPP to 3GPP, the identification of an already allocated PGW 119 from a HSS 121. The Identification of the PGW 119 may be a FQDN, a PGW IP address, an APN, and/or a PLMN identification. The retrieving module 1810 may also be referred to as a retrieving unit, a retrieving means, a retrieving circuit, means for retrieving etc. The retrieving storing module 1810 may be the processor 1805 of the HLR 135. The retrieving module 1810 of FIG. 18 may correspond to the processing unit 705 of FIG. 7.

The HLR 135 may further comprise a memory 1813 comprising one or more memory units. The memory 1813 is arranged to be used to store data, received data streams, power level measurements, handover flag, handover flag setting, request messages, response messages, contexts, acknowledgements, PGW ID, indications of that the RAT type has changed, information indicating the selected PGW, threshold values, time periods, configurations, schedulings, and applications to perform the methods herein when being executed in the HLR 135. The memory 1813 comprises instructions executable by the processor 1805. The memory 1813 of FIG. 18 may correspond to the memory 705 in FIG. 7.

Those skilled in the art will also appreciate that the receiving module 1801, the storing module 1803, the transmitting module 1808 and the retrieving module 1810 described above may refer to a combination of analog and digital circuits, and/or one or more processors configured with software and/or firmware, e.g. stored in a memory, that when executed by the one or more processors such as the processor 1805 perform as described above. One or more of these processors, as well as the other digital hardware, may be included in a single ASIC, or several processors and various digital hardware may be distributed among several separate components, whether individually packaged or assembled into a SoC.

In some embodiments, a second computer program may comprise instructions which, when executed on at least one processor, cause the at least one processor to carry out the method steps 1701-1706. A second carrier may comprise the second computer program, and the second carrier is one of an electronic signal, optical signal, radio signal or computer readable storage medium.

Figure 19:
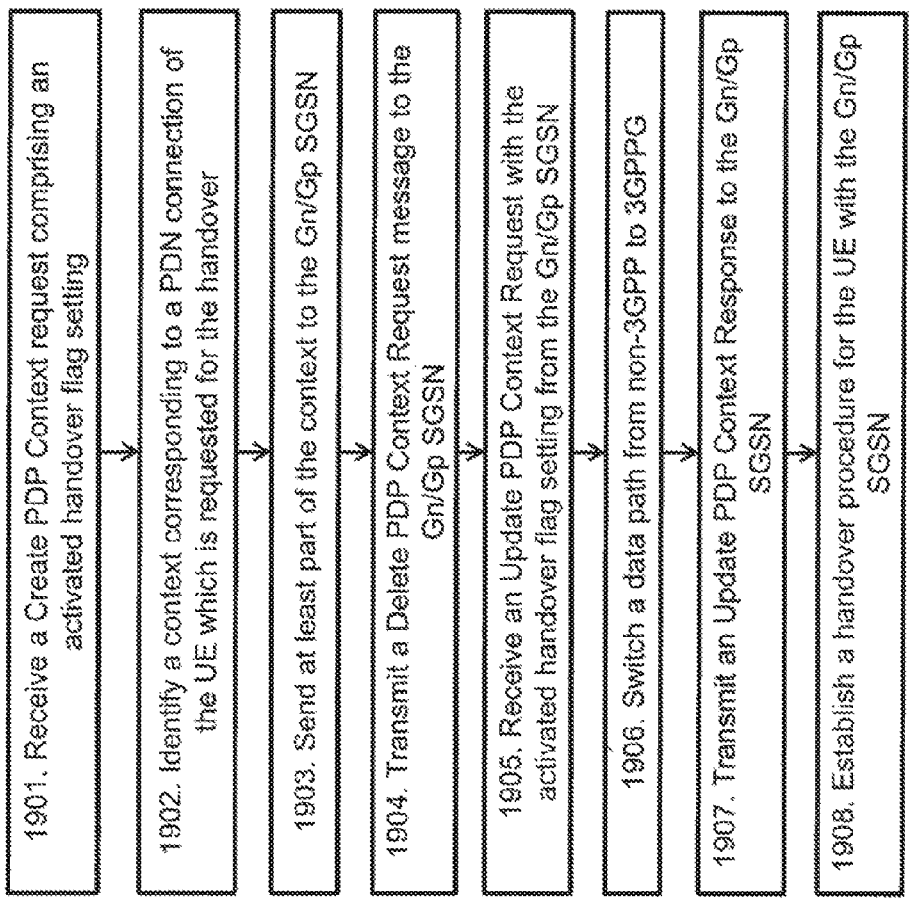
FIG. 19 is a flow chart illustrating example embodiments of a method performed by a PGW.

The method described above will now be described seen from the perspective of the PGW 119. FIG. 19 is a flowchart describing the present method performed by the PGW 119 for providing handover management. The handover may be from GERAN/UTRAN to WiFi, or from WiFi to GERAN/UTRAN, or from GERAN/UTRAN to E-UTRAN, and then to WiFi. The PGW 119 may be configured for operation in a wireless network. The method comprises at least some of the following steps to be performed by the PGW 119, which steps may be performed in any suitable order than described below:

Step 1901

This step corresponds to step 510 in FIG. 5 and step 1340 in FIG. 13. The PGW 119 receives, from a Gn/Gp SGSN 111, a Create PDP Context Request message comprising an activated handover flag setting. The activated handover flag setting indicates a handover request for a UE 101. The handover is a non-3GPP to 3GPP handover.

Step 1902

This step corresponds to step 1342 in FIG. 13. The PGW 119 may identify a context corresponding to a PDN connection of the UE 101 which is requested for the handover.

Step 1903

This step corresponds to step 511 in FIG. 5 and step 1344 in FIG. 13. The PGW 119 may send at least part of the context to the Gn/Gp SGSN 111 in a Create PDP Context Response message to accept the handover request for the UE 101.

Step 1904

This step corresponds to step 406 in FIG. 4. The PGW 119 may transmit, to the Gn/Gp SGSN 111, a Delete PDP Context Request message. The Delete PDP Context Request message may comprise an indication that a radio access type of the UE 101 has changed from 3GPP to non-3GPP. The transmitting, to the Gn/Gp SGSN 119, the Delete PDP Context Request message may be repeated for several PDP contexts which correspond to a PDN connection handed over to non-3GPP.

Step 1905

This step corresponds to step 513 in FIG. 5. If the PGW 119 can support the non-3GPP 10 to 3GPP handover, the PGW 119 may receive an Update PDP Context Request message with the activated handover flag setting from the Gn/Gp SGSN 111.

Step 1906

This step corresponds to step 514 in FIG. 5. The PGW 119 may switch a data path from non-3GPP to 3GPPG upon receipt of the Update PDP Context Request message with the activated handover flag setting.

Step 1907

This step corresponds to step 515 in FIG. 5. The PGW 119 may transmit an Update PDP Context Response message to the Gn/Gp SGSN 111.

Step 1908

This step corresponds to step 916a in FIG. 9. The PGW 119 may establish a handover procedure for the UE 101 with the Gn/Gp SGSN 111.

Figure 20:
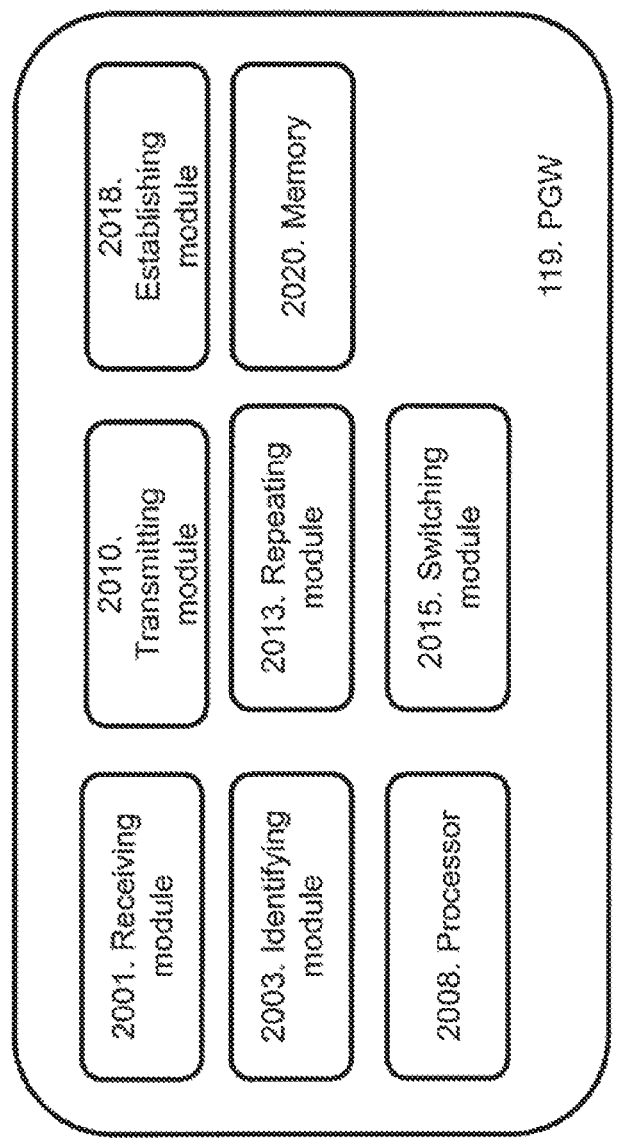
FIG. 20 is a schematic block diagram illustrating example embodiments of a PGW.

To perform the method steps shown in FIG. 19 for providing handover management, the PGW 119 may comprise an arrangement as shown in FIG. 20. The handover may be from GERAN/UTRAN to WiFi, or from WiFi to GERAN/UTRAN, or from GERAN/UTRAN to E-UTRAN, and then to WiFi.

To perform the method steps shown in FIG. 19 for providing handover management, the PGW 119 is adapted to, e.g. by means of a receiving module 2001, receive, from a Gn/Gp SGSN 111 a Create PDP Context Request message comprising an activated handover flag setting. The activated handover flag setting indicates a handover request for a UE 101. The handover is a non-3GPP to 3GPP handover. The receiving module 2001 may also be referred to as a receiving unit, a receiving means, a receiving circuit, means for receiving, input unit etc. The receiving module 2001 may be a receiver, a transceiver etc. The receiving module 2001 may be a wireless receiver of the PGW 119 of a wireless or fixed communications system. The receiving module 2001 of FIG. 20 may correspond to the receiving unit 601A in FIG. 6 and the request receiving module 1010 in FIG. 10.

The PGW 119 may be further adapted to, e.g. by means of an Identifying module 2005, identify a context corresponding to a PDN connection of the UE 101 which is requested for the handover. The identifying module 2005 may also be referred to as an identifying unit, an identifying means, an identifying circuit, means for identifying etc. The identifying module 2005 may be a processor 2008 of the PGW 119. The identifying module 2005 of FIG. 20 may correspond to the processing unit 603 of FIG. 6 and the identification receiving module 1014 in FIG. 10. The processor 2008 of FIG. 20 may correspond to the processing unit 603 in FIG. 6 and the analyzing module 1012 in FIG. 10.

The PGW 119 may be further adapted to, e.g. by means of a transmitting module 2010, send at least part of the context to the Gn/Gp SGSN 111 in a Create PDP Context Response message to accept the handover request for the UE 101. The transmitting module 2010 may also be referred to as a transmitting unit, a transmitting means, a transmitting circuit, means for transmitting, output unit etc. The transmitting module 2010 may be a transmitter, a transceiver etc. The transmitting module 2010 may be a wireless transmitter of the PGW 119 of a wireless or fixed communications system. The transmitting module 2010 of FIG. 20 may correspond to the transmitting unit 601B of FIG. 6 and the sending module 1020 of FIG. 10.

The PGW 119 may be further adapted to, e.g. by means of the transmitting module 2010, transmit, to the Gn/Gp SGSN 111, a Delete PDP Context Request message. The Delete PDP Context Request message comprises an indication that a radio access type of the UE 101 has changed from Third Generation Partnership Project, 3GPP, to non-3GPP.

The PGW 119 may be further adapted to, e.g. by means of a repeating module 2013, repeat the transmission, to the Gn/Gp SGSN 119, of the Delete PDP Context Request message for several PDP contexts which corresponds to a PDN connection handed over to non-3GPP. The repeating module 2013 may also be referred to as a repeating unit, a repeating means, a repeating circuit, means for repeating etc. The repeating module 2013 may be the processor 2008 of the PGW 119. The repeating module 2013 may correspond to the processing unit 603 of FIG. 6.

The PGW 119 may be further adapted to, e.g. by means of the receiving module 2001, receive, if the PGW 119 can support the non-3GPP to 3GPP handover, an Update PDP Context Request message with the activated handover flag setting from the Gn/Gp SGSN 111.

The PGW 119 may be further adapted to, e.g. by means of a switching module 2015, switch a data path from non-3GPP to 3GPPG upon receipt of the Update PDP Context Request message with the activated handover flag setting. The switching module 2015 may also be referred to as a switching unit, a switching means, a switching circuit, means for switching etc. The switching module 2015 may be the processor 2008 of the PGW 119. The switching module 2015 of FIG. 20 may correspond to the processing unit 603 of FIG. 6.

The PGW 119 may be further adapted to, e.g. by means of the transmitting module 2010, transmit an Update PDP Context Response message to the Gn/Gp SGSN 111.

The PGW 119 may be further adapted to, e.g. by means of an establishing module 2018, establish a handover procedure for the UE 101 with the Gn/Gp SGSN 111. The establishing module 2018 may also be referred to as an establishing unit, an establishing means, an establishing circuit, means for establishing etc. The establishing module 2018 may be the processor 2008 of the PGW 119. The establishing module 2018 of FIG. 20 may correspond to the processing unit 603 of FIG. 6 and the establishing HO module 1016 of FIG. 10.

The PGW 119 may further comprise a memory 2020 comprising one or more memory units. The memory 2020 is arranged to be used to store data, received data streams, power level measurements, handover flag, handover flag setting, request messages, response messages, contexts, acknowledgements, PGW ID, indications of that the RAT type has changed, information indicating the selected PGW, threshold values, time periods, configurations, schedulings, and applications to perform the methods herein when being executed in the PGW 119. The memory 2020 comprises instructions executable by the processor 2008. The memory 2020 of FIG. 20 may correspond to the memory 605 of FIG. 6.

Those skilled in the art will also appreciate that the receiving module 2001, the identifying module 2003, the transmitting module 2010, the repeating module 2013, the switching module 2015 and the establishing module 2018 the described above may refer to a combination of analog and digital circuits, and/or one or more processors configured with software and/or firmware, e.g. stored in a memory, that when executed by the one or more processors such as the processor 2008 perform as described above. One or more of these processors, as well as the other digital hardware, may be included in a single ASIC, or several processors and various digital hardware may be distributed among several separate components, whether individually packaged or assembled into a SoC.

In some embodiments, a third computer program may comprise instructions which, when executed on at least one processor, cause the at least one processor to carry out the method steps 1901-1908. A third carrier may comprise the third computer program, and the third carrier is one of an electronic signal, optical signal, radio signal or computer readable storage medium.

The present mechanism for providing handover management may be implemented through one or more processors, such as a processor 1603 in the Gn/Gp SGSN arrangement depicted in FIG. 16, a processor 1805 in the HLR arrangement depicted in FIG. 18 and a processor 2008 in the PGW arrangement depicted in FIG. 20, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the Gn/Gp SGSN, the HLR 135 and the PGW 119. One such carrier may be in the form of a CD ROM disc. It is however feasible with other data carriers such as a memory stick. The computer program code can furthermore be provided as pure program code on a server and downloaded to at least one of the Gn/Gp SGSN, the HLR 135 and the PGW 119.

A wireless communications system may feature the Gn/Gp SGSN 111, the HLR 135 and the PGW 119 described above for WiFi-2G/3G handover management.

Summarized, in the current 3GPP standard, the handover between UTRAN/GERAN 102, 103 and WiFi requires support of the S4 SGSN 110. If the Gn/Gp SGSN 111 is used, the handover between UTRAN/GERAN 102, 103 and WiFi is not supported. However, most operators are keeping their Gn/Gp deployments and are not upgrading their networks to support the S4-based architecture. It is currently not possible for these operators to support mobility between WiFi and GERAN/UTRAN 102, 103 accesses. In addition, in case Gn/Gp SGSNs 111 are present in the network some mobility scenarios between LTE 104 and WiFi are not supported. For example, a scenario where the UE 101 starts in GERAN/UTRAN 102, 103 (via the Gn/Gp SGSN 111), then moves to LTE 104 and then to WiFi is not supported using current standards.

A need therefore exists for a means for a Gn/Gp SGSN 111 to provide handover management for WiFi and 2G/3G in which a previously created PDP context for a previously serving PGW 119 may be utilized. The example embodiments herein enable support of mobility between GERAN/UTRAN 102, 103 and WiFi by adding the following features:

The Gn/Gp SGSN 111 provides handover related information (e.g. PGW ID) to HLR 135 when the UE 101 is connecting.

The Gn/Gp SGSN 111 receives handover related information from the UE 101 and from the HLR 135 when the UE 101 moves from WLAN to GERAN/UTRAN 102, 103.

The PGW 119 performs handover of sessions between S2a/S2b interfaces and Gn/Gp interfaces and informs the Gn/Gp SGSN 111 of the handover of the UE 101 from GERAN/UTRAN 102, 103 to WLAN.

Support for mobility between GERAN/UTRAN 102, 103 and WiFi when the Gn/Gp SGSN 111 is used. As a side effect, also support of mobility between E-UTRAN 104 and WiFi is enabled in case Gn/Gp SGSNs 111 are used in the network, e.g. scenarios where the UE 101 connects in GERAN/UTRAN 102, 103 over the Gn/Gp SGSN 111, moves to E-UTRAN 104 and then to WiFi.

Example embodiments presented herein are directed towards a means for a Gn/Gp SGSN 111 to provide handover management for WiFi and 2G/3G in which a previously created PDP context for a previously serving PGW 119 may be utilized. In order to provide a better explanation of the example embodiments presented herein, a problem will first be identified and discussed.

Example embodiments presented herein are directed towards a Gn/Gp SGSN 111, a HLR 135 and a PGW 119, and corresponding methods therein, for WiFi-2G/3G handover management.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other. Therefore, the above embodiments should not be taken as limiting the scope of the embodiments, which is defined by the appending claims.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The term "adapted to" used herein may also be referred to as "arranged to", "configured to", "capable of" or "operative to".

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or Global Positioning System (GPS) receiver; a Personal Communications System (PCS) user equipment that may combine a cellular radiotelephone with data processing; a Personal Digital Assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term user equipment shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

It should also be emphasised that the steps of the methods defined in the appended claims may, without departing from the embodiments herein, be performed in another order than the order in which they appear in the claims.

What is claimed is:

1. A method, in a Home Location Register, HLR, for providing handover management, the method comprising:
   receiving, from a Gn/Gp Serving General Packet Radio Service Support Node, SGSN, an identification of a Packet Data Network Gateway, PGW, at a Packet Data Network, PDN, connection establishment;
   storing the identification of the PGW; and
   sending the identification of the PGW to a Home Subscriber Server, HSS.

2. The method of claim 1, further comprising:
   sending, to the Gn/Gp SGSN, the identification of the PGW serving the UE upon an establishment of a handover procedure.

3. The method of claim 1, further comprising:
   transmitting an acknowledgement of the received identification of the PGW to the Gn/Gp SGSN.

4. The method of claim 1, further comprising:
   when the UE has decided to handover from non-3GPP to 3GPP, retrieving the identification of an already allocated PGW from a Home Subscriber Server, HSS.

5. The method of claim 1, wherein the identification of the PGW is at least one of a PGW Fully Qualified Domain Name, FQDN, a PGW Internet Protocol, IP, address, an Access Point Name, APN, and a Public Land Mobile Network, PLMN, identification.

6. The method of claim 1, wherein the handover is from one of:
   Global System for Mobile Communications, GSM, Enhanced Data Rates for GSM Evolution, EDGE, Radio Access Network/Universal Terrestrial Radio Access Network, GERAN/UTRAN, to WiFi;
   WiFi to GERAN/UTRAN; and
   GERAN/UTRAN to Evolved-Universal Terrestrial Access Network, E-UTRAN, and then to WiFi.

7. A Home Location Register, HLR, for providing handover management, the HLR being configured to:

receive, from a Gn/Gp Serving General Packet Radio Service Support Node, SGSN, an identification of a Packet Data Network Gateway, PGW, at a Packet Data Network, PDN, connection establishment;

store the identification of the PGW; and send the identification of the PGW to a Home Subscriber Server, HSS.

8. The HLR of claim 7, being further configured to:

send, to the Gn/Gp SGSN, the identification of the PGW serving the UE upon an establishment of a handover procedure.

9. The HLR of claim 7, being further configured to:

transmit an acknowledgement of the received identification of the PGW to the Gn/Gp SGSN.

10. The HLR of claim 7, being further configured to:

retrieve, when the UE has decided to handover from non-3GPP to 3GPP, the identification of an already allocated PGW from a Home Subscriber Server, HSS.

11. The HLR of claim 7, wherein the identification of the PGW is at least one of a PGW Fully Qualified Domain Name, FQDN, a PGW Internet Protocol, IP, address, an Access Point Name, APN, and a Public Land Mobile Network, PLMN, identification.

12. The HLR of claim 7, wherein the handover is from one of:

Global System for Mobile Communications, GSM, Enhanced Data Rates for GSM Evolution, EDGE, Radio Access Network/Universal Terrestrial Radio Access Network, GERAN/UTRAN, to WiFi;

WiFi to GERAN/UTRAN; and

GERAN/UTRAN to Evolved-Universal Terrestrial Access Network, E-UTRAN, and then to WiFi.

13. A computer storage medium storing a computer program comprising instructions which, when executed on at least one processor, cause the at least one processor to carry out a method, in a Home Location Register, HLR, for providing handover management, the method comprising:

receiving, from a Gn/Gp Serving General Packet Radio Service Support Node, SGSN, an identification of a Packet Data Network Gateway, PGW, at a Packet Data Network, PDN, connection establishment;

storing the identification of the PGW; and sending the identification of the PGW to a Home Subscriber Server, HSS.

* * * * *